United States Patent
Yamamichi

(10) Patent No.: US 8,270,851 B2
(45) Date of Patent: Sep. 18, 2012

(54) PRINT OUTPUT SYSTEM, PRINT CONTROL APPARATUS, AND METHOD FOR THE SAME

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 12/816,953

(22) Filed: Jun. 16, 2010

(65) Prior Publication Data

US 2010/0322661 A1    Dec. 23, 2010

(30) Foreign Application Priority Data

Jun. 19, 2009   (JP) .................................. 2009-146206

(51) Int. Cl.
  *G03G 15/00*   (2006.01)

(52) U.S. Cl. ................................ 399/8; 358/1.15; 399/9

(58) Field of Classification Search .................. 399/1, 2, 399/8, 9, 38, 75, 82; 358/1.15
See application file for complete search history.

(56) References Cited

U.S. PATENT DOCUMENTS

| | | | | |
|---|---|---|---|---|
| 7,180,626 B1 * | 2/2007 | Gassho et al. | ........... | 358/1.15 X |
| 7,590,360 B2 * | 9/2009 | Yonenaga | .......................... | 399/8 |
| 7,619,765 B2 * | 11/2009 | Kimura et al. | ............... | 358/1.15 |
| 2001/0048533 A1 * | 12/2001 | Koana | .......................... | 358/1.15 |
| 2004/0080779 A1 * | 4/2004 | Kawamoto | ............... | 358/1.15 X |
| 2010/0014114 A1 * | 1/2010 | Oosawa | ....................... | 358/1.15 |
| 2010/0073705 A1 * | 3/2010 | Cain | .......................... | 358/1.15 |

FOREIGN PATENT DOCUMENTS

JP    2001-197297 A    7/2001

* cited by examiner

*Primary Examiner* — Sophia S Chen

(74) *Attorney, Agent, or Firm* — CANON U.S.A., INC. IP Division

(57) ABSTRACT

A system, a control apparatus, a control method and a computer program are provided which are configured to control a printing output in response to characteristics of a printing apparatus when a plurality of printing apparatuses has different characteristics. A host computer acquires apparatus information including characteristics information indicating the characteristics of a printer and thereby determines a priority order of printers in relation to the print data based on the characteristics information. The host computer then determines a printer to output the print data based on the determined priority order and outputs the print data to the determined printer.

12 Claims, 17 Drawing Sheets

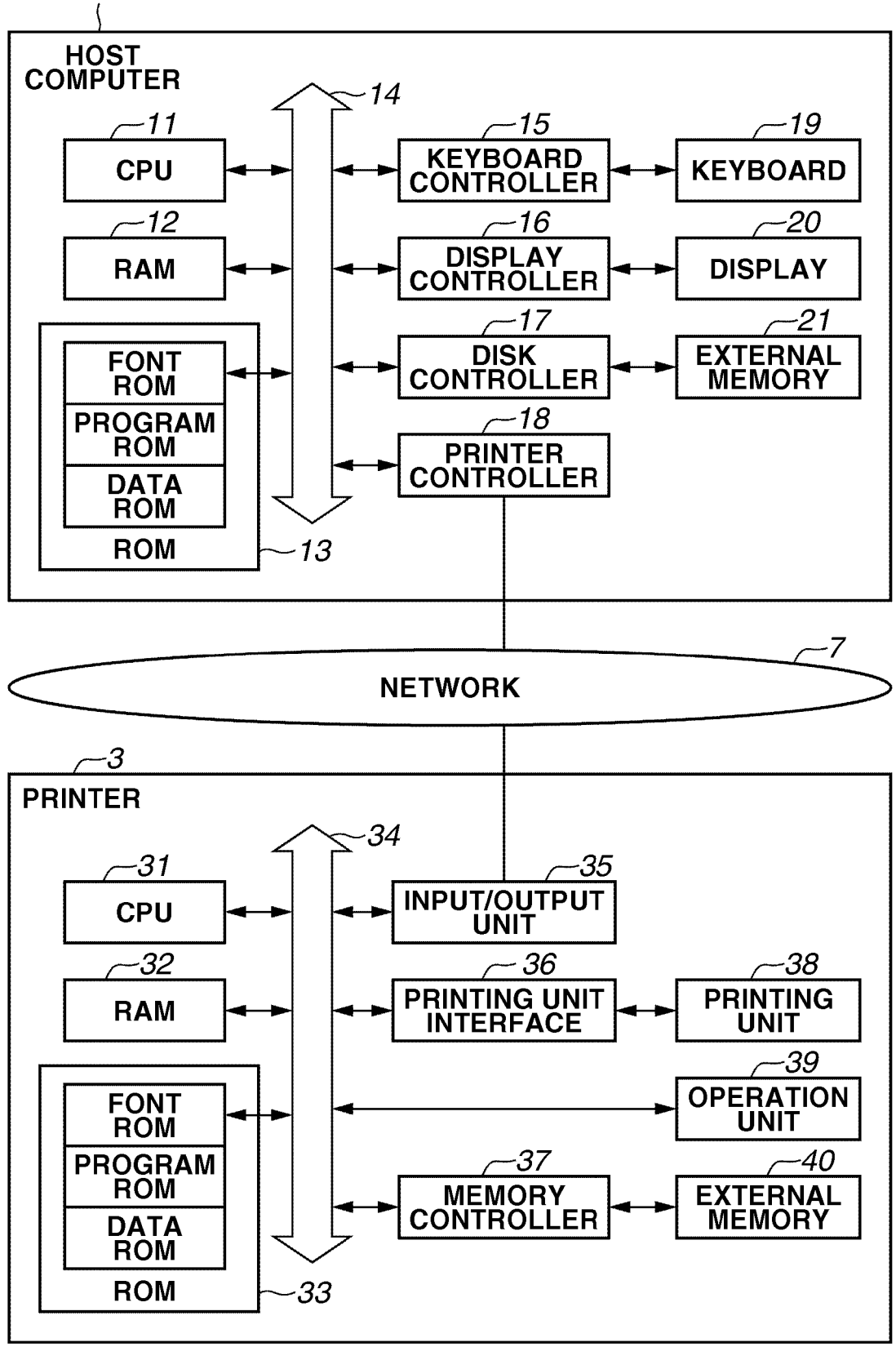

SET OPERATION RATE FOR ON-DEMAND APPARATUS

FIRST OPERATION RATE: 70    SECOND OPERATION RATE: 80    THIRD OPERATION RATE: 90

SET OPERATION RATE FOR ROLLER DEVICE

FOURTH OPERATION RATE: 70    FIFTH OPERATION RATE: 90

---OPERATION RATE CALCULATION METHOD---
- ⦿ AVERAGE VALUE FROM STARTUP TO CURRENT TIME
- ○ AVERAGE VALUE IN PREVIOUS SEVERAL HOURS
    - CALCULATION TIME  1

☑ SET WORKING HOURS
  ☑ MONDAY ☑ TUESDAY ☑ WEDNESDAY ☑ THURSDAY ☑ FRIDAY ☐ SATURDAY ☐ SUNDAY
  CALCULATION TIME  9:00 – 12:00, 13:00 – 17:00

[ OK ]  [ CANCEL ]

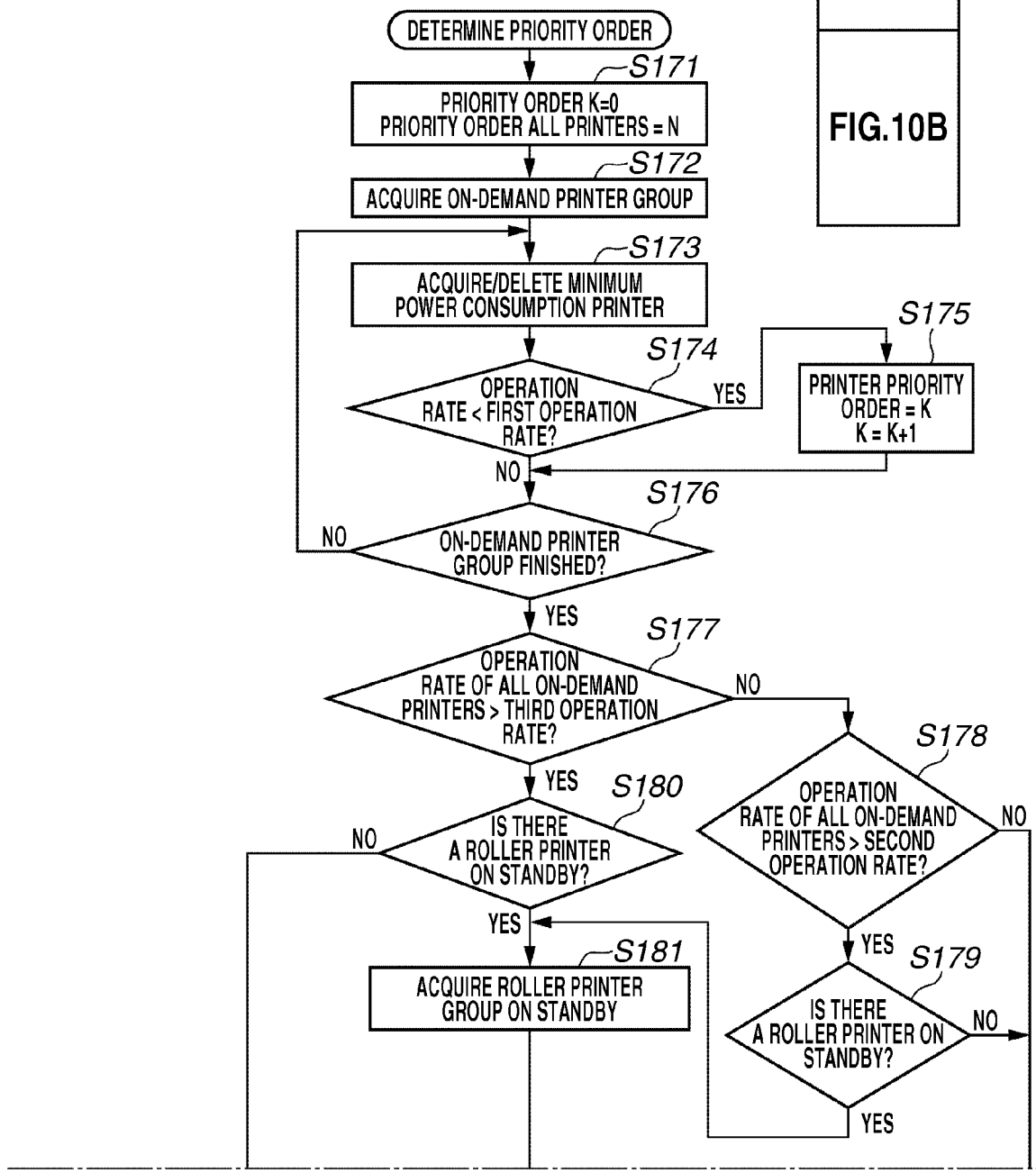

|  | POWER CONSUMPTION | PRINTING SPEED |
|---|---|---|
| ROLLER TYPE | LARGE | FAST |
| ON-DEMAND TYPE | SMALL | SLOW |

PRINT OUTPUT SYSTEM, PRINT CONTROL APPARATUS, AND METHOD FOR THE SAME

BACKGROUND OF THE INVENTION

1. Field of the Invention

The present invention relates to a print output system, a print control apparatus and a print control method which are configured to control print output by a plurality of printing apparatuses.

2. Description of the Related Art

A conventional printing apparatus such as a digital copying machine, a laser beam printer (LBP), a facsimile apparatus is connected to a network and printout is executed by sending documents or images from a personal computer connected to the network to the printing apparatus. The printing apparatus can be set so that when it is not manipulated and operated within a predetermined time, for example, on the operation panel, power supply is stopped to a fixing device or the like which has high power supply, and the printing apparatus transits to a sleep state (power saving mode) which is configured to suppress power consumption for the overall apparatus.

In a conventional print output system, since the conditions for shifting to power saving mode vary depending on each apparatus, comprehensive power saving management of a printing apparatus connected to a specified network has been difficult. For example, it is assumed that there are two printers connected to a plurality of personal computers, one printer is operating and the other printer is in power saving mode. When a print output signal is output from another personal computer, normally, the printer in power saving mode is operated. The image processing apparatus proposed in Japanese Patent Application Laid-Open No. 2001-197297 determines a sleep condition for a printer, and when print output is not urgent, waits for completion of the current print job (JOB) performed by the currently operating printer. Thereafter the plurality of printing apparatuses connected to the network is controlled to execute new printing jobs.

Although the conventional technique takes the state of the printing apparatus into account, the characteristics of the printing apparatus are not considered. Thus when a plurality of printing apparatuses with mutually different characteristics are present on a network, there is the situation that overall power consumption actually increases. For example, currently, a fixing device constituting a digital copying machine employs the fixing method illustrated in FIG. 3A or the fixing method illustrated in FIG. 3B as described hereafter. The fixing method in FIG. 3A is of a roller type and the fixing method in FIG. 3B is of an on-demand type.

FIG. 13 illustrates the characteristics of the fixing device and the relationship between temperature and printing for each fixing method. FIG. 13A illustrates the characteristics of an on-demand type and a roller type. Generally, a roller type has high power consumption and a high printing speed. An on-demand type has low power consumption and a low printing speed. FIG. 13B conceptually illustrates the relationship between printing and the temperature of a fixing device in a digital copying machine based on mutually different fixing methods. In contrast to a digital printing apparatus provided with a fixing device on the basis of an on-demand type fixing method, a digital copying machine provided with a fixing device on the basis of a roller-type fixing method is maintained at high temperature (standby state), which results in high power consumption even after execution of printing. If a new print job is started again within the period from standby to a low-temperature state (sleep state), the high-temperature state further continues, which results in high power consumption. Therefore when an on-demand type and a roller-type digital copying machine are both present in a print output system, in order to suppress power consumption, the characteristics of the printing apparatuses is to be sufficiently considered.

Further, the conventional technique does not consider an operation state or operation rate in addition to characteristics such as the fixing method of the printing apparatus when determining an apparatus to execute print output. Thus in the conventional technique, for example, there is a situation such as an increase in the power consumption of the overall system resulting from biased selection of a roller-type printing apparatus, which has high power consumption as the apparatus to execute print output. A further situation is that printing efficiency of the overall system cannot be increased due to biased selection of an on-demand type printing apparatus which has low power consumption but a slow printing speed as the apparatus to execute print output.

SUMMARY OF THE INVENTION

According to an aspect of the present invention, a system includes a plurality of printing apparatuses having different characteristics and a control apparatus configured to control output processing of print data according to the printing apparatus. The control apparatus is provided with a data acquisition unit configured to acquire print data, an information acquisition unit configured to acquire the information including characteristics information indicating characteristics of the printing apparatus, a priority order determination unit configured to determine a priority order of the plurality of printing apparatuses which output print data based on the characteristics information, an output apparatus determination unit configured to determine a printing apparatus which outputs print data based on the determined priority order, and an output unit configured to cause the determined printing apparatus to output the printed data. The determined printing apparatus receives the print data and executes an output process based on the print data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a hardware configuration example of a host computer and a printer.

FIGS. 5A and 5B illustrate an example of printer selection information and a setting screen for printer selection information.

DESCRIPTION OF THE EXEMPLARY EMBODIMENTS

Various exemplary embodiments, features, and aspects of the invention will be described in detail below with reference to the drawings.

Figure 1:
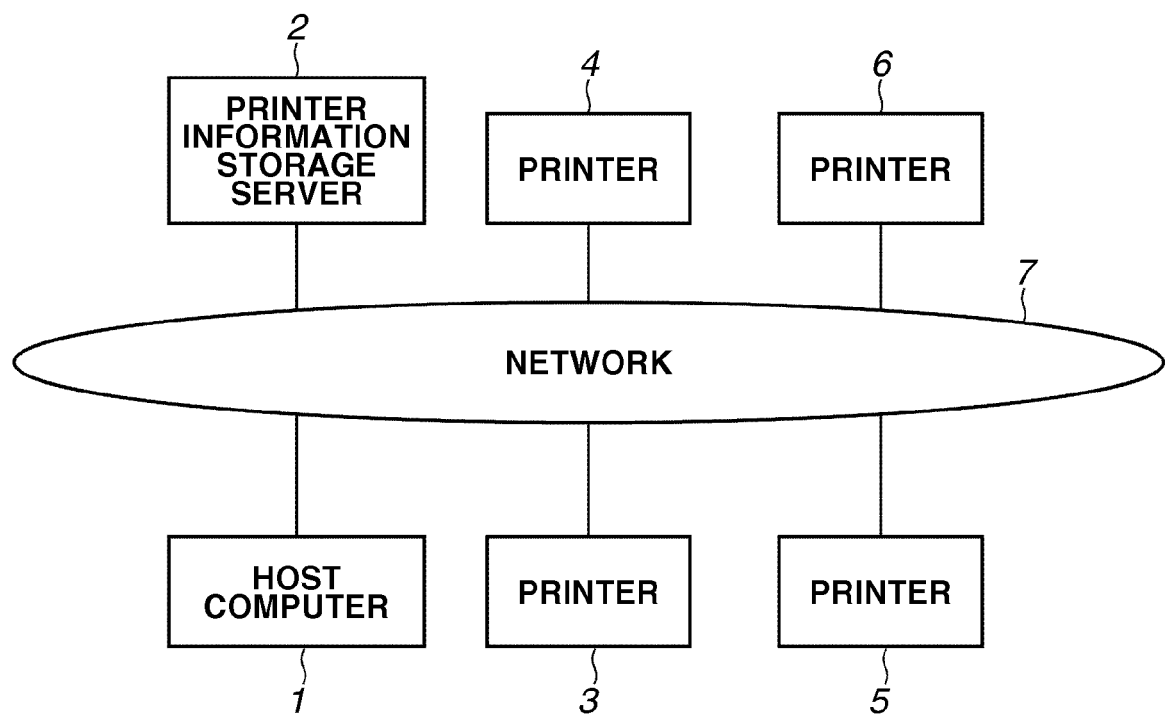
FIG. 1 illustrates an example of a configuration of a print output system according to the present exemplary embodiment.

FIG. 1 illustrates an example of a configuration of a print output system according to the present exemplary embodiment. The print output system according to the present exemplary embodiment includes a host computer 1, a printer information storage server 2 and printers 3-6 configured as printing apparatuses. Each processing apparatus provided in the print output system is mutually connected via a network 7. The host computer 1 is a computer used by a user. The host computer 1 can generate documents and exchange emails with other processing apparatus connected to the network (LAN) 7. The host computer 1 receives printing requests from a user and generates print data according to the content of the printing request. The host computer 1 executes print output of the generated print data using any one of printers 3-6. In other words, the host computer 1 functions as a print control apparatus configured to control printing instructions based on print data for a printer.

The printer information storage server 2 receives printer information from the printers 3-6. The printer information is apparatus information including output print characteristics information, which indicates at least output print characteristics of a printer. The printer information will be described below referring to FIGS. 6A and 6B. The printer information storage server 2 stores received printer information in a storage area provided either in the server 2 itself or in another information device. For example, the printer information storage server 2 stores printer information in a printer information data base (DB) 204 described below referring to FIG. 4. The printers 3-6 receive print data from the host computer and execute printing processing according to the received print data. In this example, the printers 3, 4 include a fixing device which will be described below referring to FIG. 3A. The printers 5 and 6 include a fixing device which will be described below referring to FIG. 3B. Thus, the system includes a printing apparatus having different output print characteristics.

For example, the print-out sheet number per unit time of the printers 3, 4, 5 and 6 is respectively denoted as V1, V2, V3, and V4. The power consumption per unit time of the printers 3, 4, 5 and 6 is respectively denoted as P1, P2, P3 and P4. In the present example, V1 to V4 have a relationship such that V1>V2>V3>V4, and P1 to P4 have a relationship such that P1>P2>P3>P4. All of the printers 3, 4, 5 and 6 have a standby mode in which electrical components consume power and a sleep mode in which there is almost no power consumption. When the transit time from standby mode to sleep mode in the printers 3, 4, 5 and 6 is T1, T2, T3 and T4, T1-T4 have the relationship such that T1>T2>T3>T4.

FIG. 2 illustrates a hardware configuration of the host computer 1 and the printer 3 provided with the print output system illustrated in FIG. 1. The printers 4, 5, 6 illustrated in FIG. 1 have the same configuration as the printer 3. The host computer 1 includes a central processing unit (CPU) 11, a random access memory (RAM) 12, a read only memory (ROM) 13, a system bus 14 and a keyboard controller 15. The host computer 1 includes a display controller 16, a disk controller 17, a printer controller 18, a keyboard 19, a display 20 and an external memory 21. The CPU 11 controls document processing according to document processing programs stored in the external memory 21 or the program. ROM contained in the ROM, in addition to execution of printing processing based on the document processing. Document processing refers to, for example, processing of documents including figures, images, characters and tables (including spread sheets). The CPU 11 controls each device connected to the system bus 14. The RAM 12 functions as a work area, a main memory for the CPU 11, or the like.

The ROM 13 includes a program ROM, a font ROM and a data ROM. An operating system (OS) program or the like is stored as a control program for the CPU 11 in the program ROM in the ROM 13 or in the external memory 21. Furthermore the font ROM in the ROM 13 or the external memory 21 stores font data or the like used in document processing. The data ROM in the ROM 13 or the external memory 21 stores various types of data used when executing document processing or the like. The CPU 11, the RAM 12, the ROM 13, the keyboard controller 15, the display controller 16, the disk controller 17 and the printer controller 18 are connected to the system bus 14.

The keyboard controller 15 controls key input from a keyboard 19 or a pointing device (not illustrated). The display controller 16 controls display by the display 20. The disk controller 17 controls access to the external memory 21. The external memory 21 may include a floppy disk (registered trademark) or a hard disk configured to store boot programs, various types of applications, font data, user files, edit files, programs generating printer control commands or the like. The printer controller 18 is connected to the printer 3 via the network 7 and executes communication control processing with the printer 3. The CPU 11 opens various types of prerecorded windows and executes various types of data processing based on commands input via a mouse cursor (not illustrated) on the display 20. When executing printing, a user can open a window related to printing settings, and execute settings for a printing processing such as printer settings or printing mode selection.

The printer 3 includes a CPU 31, a RAM 32, a ROM 33, a system bus 34, an input/output unit 35, a printing unit interface 36, a memory controller 37, a printing unit 38, an operation unit 39 and an external memory 40. The CPU 31 controls the overall operations of the printer 3. The CPU 31 inputs image signals as print output information to a printing unit 38 via a printing unit interface 36 based on control programs stored in the ROM 33 or the external memory 40. The printing unit 38 may be also referred to as a printer engine.

The RAM 32 functions as a work area, a main memory for the CPU 32 or the like. Memory capacity can be expanded by an optional RAM connected to an expansion port (not illustrated). The RAM 32 is used as an output information development area, environmental data storage area, non-volatile random access memory (NVRAM) or the like. The ROM 33 includes a font ROM, program ROM and data ROM. The font ROM in the ROM 33 stores font data used when generating print output information. The program ROM in the ROM 33 stores control programs or the like for the CPU 31. When a printer does not include an external memory 44 such as a hard disk or the like, the data ROM in the ROM 33 stores various types of information used in the processing of the printer 3.

The CPU 31, the RAM 32, the ROM 33, the input/output unit 35, the printing unit interface 36, the memory controller 37, and the operation unit 39 are connected to the system bus 34. The input/output unit 35 is a network card or the like. The CPU 31 sends and receives data to or from the printer 3 and the host computer 1 via the network 7 and the input/output unit 35. In this manner, information or the like in the printer 3 is notified to the host computer 1. The printing unit interface 36 provides an interface between the CPU 31 and the printing unit 38. The memory controller 37 controls access to the external memory 40. The printing unit 38 forms an image based on an image signal input from the CPU 31 via the printing unit interface 36 and the fixing device forms a permanent image on a sheet. The operation unit 39 executes processing according to user operations. The operation unit 39 for example is an operation panel and includes a switch configured for operation by a user, a light emitting diode (LED) display device or the like. In the present exemplary embodiment, the printer 3 includes a NVRAM (not illustrated) and the NVRAM may be configured to store printer mode setting information input from operation unit 39. The external memory 40 is a hard disk, an IC card or the like. The external memory 40 is connected as option and stores font data, emulation programs, form data or the like.

Figure 3A:
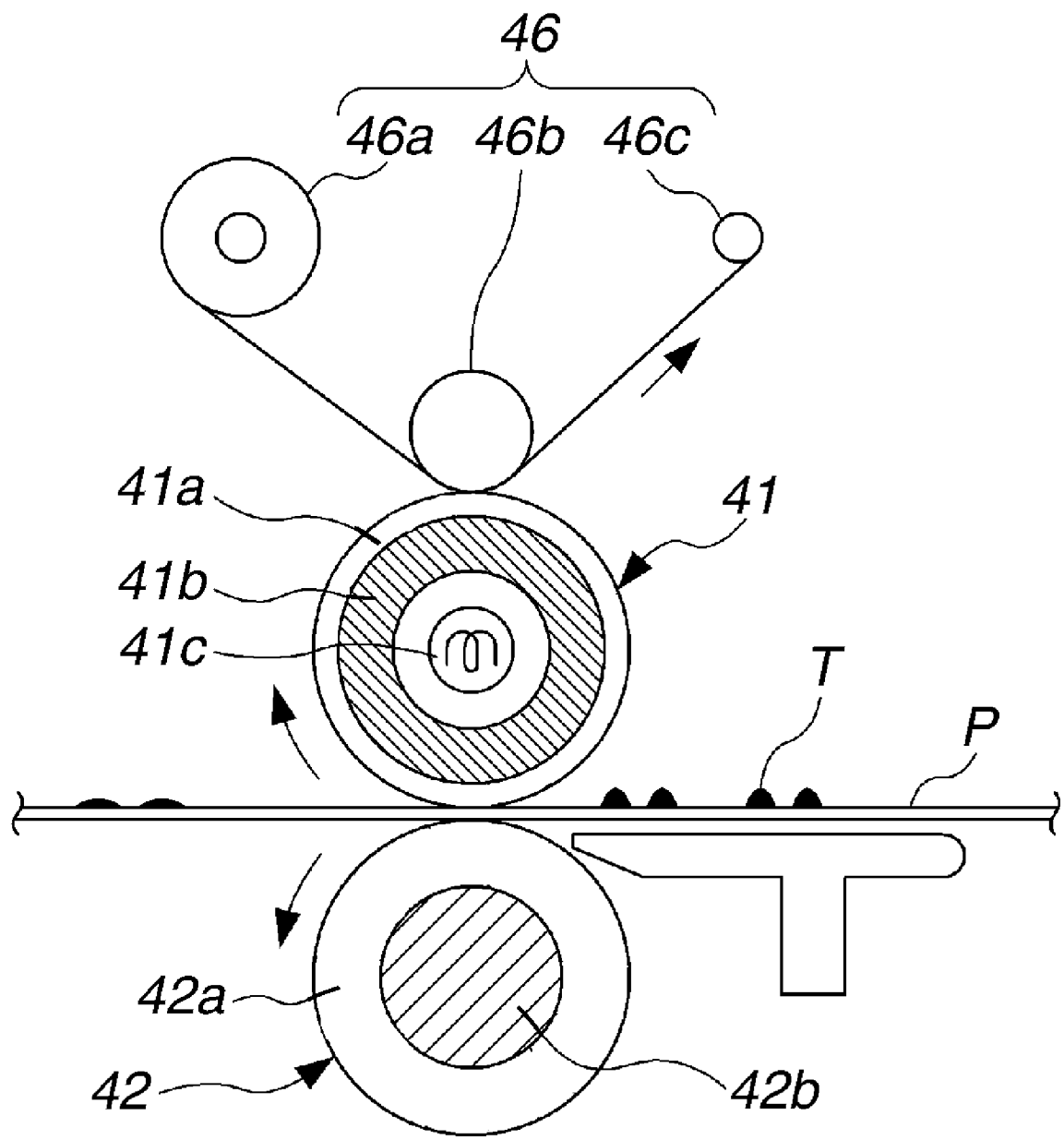
FIGS. 3A and 3B illustrate an example of a fixing device provided in a printer engine.

FIG. 3 illustrates an example of a fixing device provided in a printer engine which is a printing unit for the printer. FIG. 3A illustrates an example of a fixing device provided in a printing unit for the printers 3, 4 illustrated in FIG. 1. In this example, the fixing device is configured with a heat roller. The fixing roller 41 provided in the fixing device includes a hollow cylindrical core 41b forming a release layer 41a on an outer peripheral surface. The release layer 41a is formed from fluororesin and prevents generation of offset. The fixing roller 41 includes a halogen lamp 41c stored in the core 41b. A pressure roller 42 is pressed to contact the fixing roller 41. The pressure roller 42 forms a nip portion in coordination with the fixing roller 41 to sandwich and convey a transfer member. The pressure roller 42 has a cylindrical core 42b. The outer peripheral surface of the core 42b is covered by an elastic body 42a such as a rubber. A cleaning unit 46 includes a rolled fabric cleaning member 46a, a web roller 46b, and a take-up roller 46c. A non-fixed toner image T is transferred onto the upper face of a recording member P. The recording member P is sandwiched and conveyed by the nip formed by the roller 42 which rotates in a clockwise direction and a roller 41 heated and rotated in a counter-clockwise direction to thereby perform simultaneous execution of heating and fixing.

The fixing device illustrated in FIG. 3A has a relatively large heat capacity and therefore is used when executing high-speed mass copying and displays little temperature reduction caused by passage of the recording member. However this fixing device does not save power when copy numbers are low. Furthermore, the fixing device shows following limit in starting a copying or printing operation with a short waiting time when there is a copying request or printing request. Namely, even when the apparatus is not operating, the temperature of the fixing roller 41 is to be maintained at a temperature which is sufficient for fixing operations, or at a temperature sufficient for execution of fixing operations with slight heating. The temperature adjustment of the fixing roller 41 when the apparatus is not operating is termed standby temperature adjustment. The roller temperature and power consumption during standby temperature adjustment are determined variously by copy speed, toner, the roller material or the like, and for example, power of 200 W-700 W is consumed to maintain a roller temperature of 200° C. Power saving in an overall system using a fixing device as illustrated in FIG. 3A is to use the detection of the state of the fixing device to determine whether or not it is to be used. In the present exemplary embodiment, the group formed by the printer 3 and the printer 4 including a fixing device which uses standby temperature adjustment as described above is termed a roller printer.

Figure 3B:
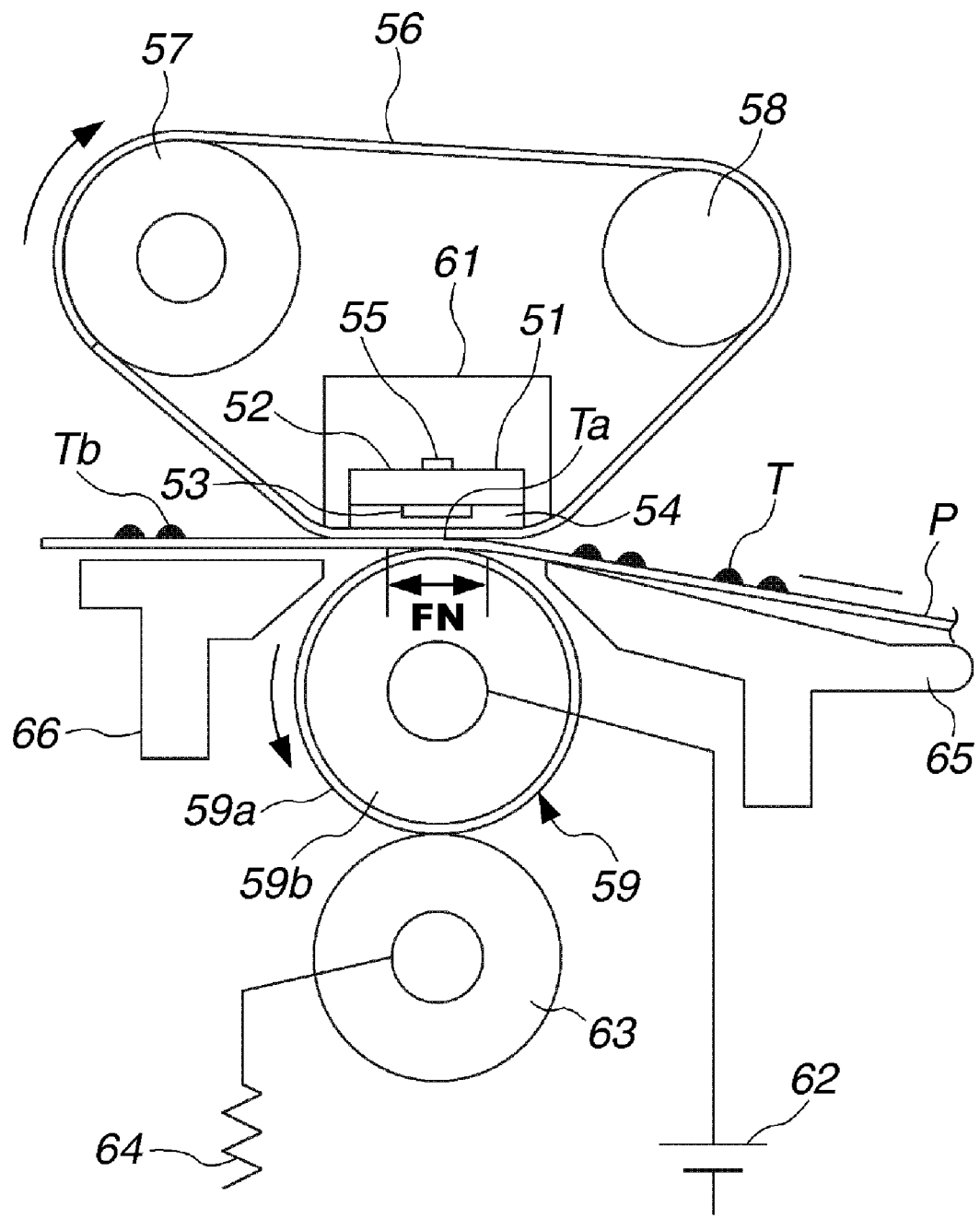

FIG. 3B illustrates an example of a fixing device provided in a printer engine which is a printing unit of the printer 5, 6 illustrated in FIG. 1. A fixing film 56 is an endless-belt film member configuring a heating unit. The fixing film 56 is expanded between a left drive roller 57, a right driven roller 58 and a low-heat capacity linear heater 51 functioning as a heating body provided below the rollers 57, 58. Since the fixing film 56 repeatedly heats and fixes the toner image, excellent heat resistant properties, separation properties and durability are to be used. The thickness of the fixing film 56 is generally of 100 µm or less, and in one embodiment, of 40 µm or less. For example, a fixing film may be used in which a resin having a predetermined high temperature resistance, a resin having predetermined low surface-energy on the outer surface of a thin metallic endless film such as nickel, SUS or the like, or a separation coated layer formed by adding an electrical conducting material such as carbon black to the above resin is applied in a 10 µm thickness. Resins having a predetermined high temperature resistance may include polyether ether ketone, polyether sulfone, polyether imide or polyimide at a thickness of 20 µm. Resins having predetermined low surface-energy may include polytetrafluoroethylene (PTEF) and tetrafluoroethylene-perfluoroalkyl vinyl ether copolymer resin (PFA).

The low heat capacity heater 51 acting as a heating body configuring the heating unit together with the fixing film 56 is mounted on and supported by a heater support body 61. The heater 51 for example forms a heat generating layer 53 formed by coating a low-resistance material such as silver palladium or ruthenium oxide onto an aluminum base 52 over which is formed a protective layer 54 such as glass taking into account sliding with the 10 µm thick fixing film 56. The aluminum base 52 for example has a thickness of 1.0 mm, a width of 10 mm and a longitudinal length of 340 mm. The low-resistance material is coated onto the aluminum base 52 with a thickness of 10 µm and a width of 1.0 mm.

Since the heater supporting body 61 performs heat insulation and supports the heater 51 on the fixing device, it has heat insulation properties, high heat resistance properties and rigidity. For example, the heating support body 61 is formed from polyphenylene sulfide (PPS), polyether ether ketone (PEEK), a high heat resistant resin such as a liquid crystal polymer or a composite material formed from these resins together with a resin or ceramic. An alternating current of 100V is applied from both longitudinal ends to the heat generating layer 53. A negative temperature coefficient (NTC) thermistor 55 is integrated, pressured or attached using a heat-conductive silicone rubber adhesive or the like to the rear surface of the base 52. Supply of current is controlled by a control unit (not illustrated) in response to a detected temperature of the thermistor 55.

The driven roller 58 includes a tension roller configured to apply a tension in the direction of outward stretch of the fixed film 56. The tensioned fixed film 56 is driven along with the clockwise rotation of the drive roller 7, which is provided with a surface silicone rubber covering to create an enhanced frictional coefficient, with a predetermined circumferential speed in the same clockwise direction to avoid creases, meandering or delay. The pressure roller 59 has a longitudinal length of 380 mm and a diameter of 25 mm. The pressure roller 59 is covered for example with an insulating tube 59a of a fluorine resin such as PFA which has excellent separation properties and durability. An electrically conductive rubber layer 59b is provided as an electrically conductive member in an inner section. The pressure roller 59 sandwiches a lower portion of the endless-belt fixing film 56 with the heater 51 and is pressed onto the lower surface of the heater 51 with a resilient force of 5-10 kgf by a resilient member such as a spring and is rotated in a counterclockwise direction to the direction of conveying the recording member P. The inner side of the pressure roller 59 is placed in contact with a bias 62. The roller 63 is rotated by the pressure roller 59. The inner side of the roller 63 is earthed by a resistor 64.

A guide 65 in a fixing device having the configuration illustrated in FIG. 3B guides the recording member (heated member) having a non-fixed toner image (developer image) T transferred onto an upper surface during an image forming operation. The recording member P is inserted between a heater 51 formed via a fixing film 56 and a pressure portion (hereafter fixing nip portion) FN of the pressure roller 59. In this manner, the non-fixed toner image T becomes closely attached to the lower surface of the fixing film 56 and passes through the rollers under the pressure of the fixing nip portion FN laminated together with the fixing film 56 without surface shift, creasing or inclination. The toner image retaining surface of the recording member P passes through the fixing nip portion FN pressed and fixed onto the surface of the fixing film 56 and is subjected to heating by the heat generating layer 53 via the fixing film 56. In this manner, the toner image T becomes an image Ta which is melted at a high temperature and softened and attached to the surface of the recording member P.

The recording member P passing through the fixing nip portion FN is guided by the guide 66 and cooled, and the softened and attached image Ta is transformed into an image Tb which is attached to a toner image retaining surface of the recording member P. In a fixing device configured as illustrated in FIG. 3B, the heat capacity of the heat generating layer 53 and the base 52 of the heater 51 is low and these components are insulated from the heat supported by the heater supporting body 61. Thus the surface temperature of the fixing nip portion FN of the heater 51 increases in a short time to a temperature which is sufficient to melt the toner. In this manner, the heater 51 is pre-heated and there is no requirement for so-called standby temperature adjustment and therefore energy can be saved. Moreover a temperature increase inside the apparatus can be prevented. However since the heat capacity is low, there is a reduction in heat resulting from passage of the paper. Thus there is a limit to high-speed printing operations in which many sheets of paper pass per unit time.

Although the fixing device having the configuration illustrated in FIG. 3B uses a thin fixing film, a heat roller may be used instead of a fixing film. In the present exemplary embodiment, the group formed from the printer 5 and the printer 6 which include a fixing device which does not require standby temperature adjustment is an on-demand printer.

Figure 4:
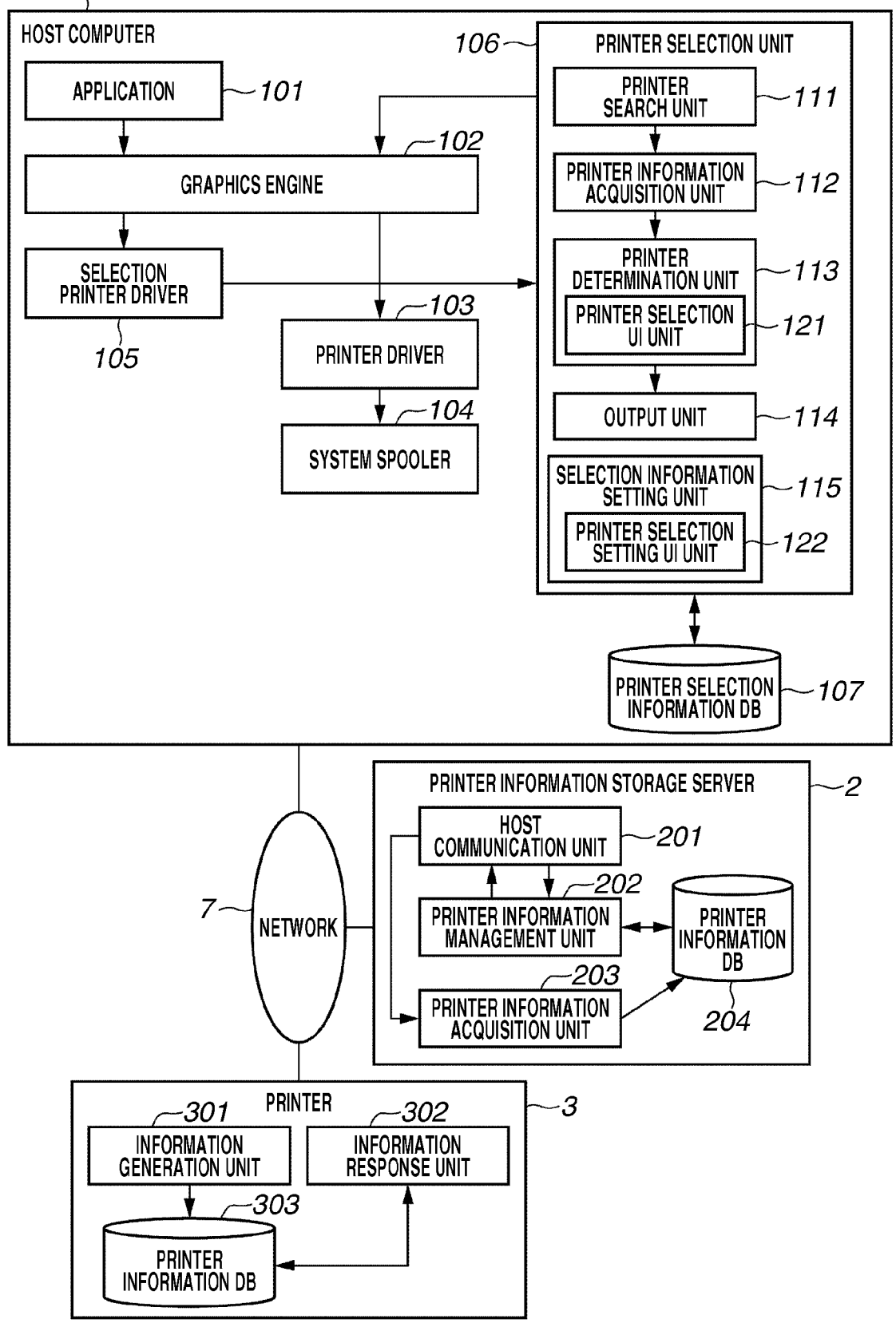
FIG. 4 is a block diagram illustrating the functions of a print output system according to the present exemplary embodiment.

FIG. 4 is a block diagram illustrating the functions of a print output system according to the present exemplary embodiment. In FIG. 4, a single printer 3 is illustrated as an example of a printer connected to a host computer 1 via a network 7. However in the present exemplary embodiment, as described referring to FIG. 1, in reality a plurality of printers (for example the printers 3-6) are connected to the host computer 1. The host computer 1 includes an application 101, a graphics engine 102, a printer driver 103, a system spooler 104, a selection printer driver 105, a printer selection unit 106 and a printer selection information DB 107. The application 101, the graphics engine 102, the printer driver 103 and the system spooler 104 are provided as a file stored in an external memory 21. These components are provided as program modules which are loaded onto the RAM 12 and executed by the OS or by a module using its module. The application 101 and the printer driver 103 may be added to a hard disk in the external memory 21 via a network (not illustrated) or a CD-ROM (not illustrated) or a floppy disk (registered trademark) of the external memory 21.

The application 101 is software executing a print output processing. The application 101 is loaded onto the RAM 12 illustrated in FIG. 2 and executed. When the application 101 is executed and the print output processing is commenced, the graphic engine 102 executes drawing processing to generate print data. The graphic engine 102 is loaded onto the RAM 12 and executed in the same manner as the application 101. The printer driver 103 converts the output of the application 101 to a control command for the printer which will execute the print output. The control command is a command instructing the device to perform the print output of the print data generated by the graphic engine 102. The printer driver 103 is prepared for each printer connected with the host computer 1 via the network 7 and is loaded from the external memory 21 onto the RAM 12 for execution. The system spooler 104 outputs a printer control command converted by the printer driver 103 via the network 7 to the printer which will execute the print output. The printer receiving the printer control command executes the print output. The system spooler 104 is loaded onto the RAM 12 illustrated in FIG. 2 and executed.

The selection printer driver 105 has the function of a print data acquisition unit configured to receive print data via the graphics engine 102. The selection printer driver 105 transfers the received print data to the output unit 114 of the printer selection unit 106 which will be described below. The selection printer driver 105, upon receiving print data, starts up the printer selection unit 106. The printer selection unit 106 determines the printer which will execute the print output from the plurality of printers corresponding to the printer driver 103 and executes control to cause the determined printer to execute the print output. The printer selection information is pre-stored in the printer selection information DB 107.

The printer selection unit 106 includes a printer search unit 111, a printer information acquisition unit 112, a printer determination unit 113, an output unit 114 and a selection information setting unit 115. The printer search unit 111 searches for the printer driver 103 which is currently installed in the host computer 1 and acquires the printer corresponding to the search result. The printer information acquisition unit 112 acquires printer information corresponding to the printer acquired by the printer search unit 111 of the printer information in the printer information DB 204. More specifically, the printer information acquisition unit 112 acquires printer information via the host communication unit 201 of the printer information storage server 2 and the network 7. The printer information is apparatus information at least including output print characteristics information indicating the print output characteristics of the printer. The print output characteristics information includes at least information regarding power consumption of the printer and the method used by the fixing device provided in the printer. In other words, the printer information acquisition unit 112 is an apparatus information acquisition unit configured to acquire apparatus information stored in the printer information DB 204. The printer information may also include print output characteristics information, the operating state of the printer and the printer operating rate information. When different methods are employed by the fixing devices, the power consumption differs according to transition of a printing state including power saving mode.

The printer determination unit 113 acquires printer selection information from the printer selection information DB 107. The printer selection information is information configured to indicate the selection standard of the printer which executes print output of the print data and is selection standard information including a threshold for the operation rate of the printer according to the method used by the fixing device provided in the printer. In other words, the printer determination unit has the function of a selection standard information acquisition unit configured to acquire selection standard information. The printer determination unit 113 receives printer information from the printer information acquisition unit 112. The printer determination unit 113 determines a priority order of the printers selected by the printer searching unit 111 based on the print characteristics information contained in the printer information. The priority order is the priority order related to use of the printers. In other words, the printer determination unit 113 is a priority order determination unit configured to determine a priority order of the printers for the output of the print data based on the print characteristics information contained in the acquired printer information.

In this exemplary embodiment of the present invention, the printer determination unit 113 determines the priority order based on the print characteristics information so that a printer in a power-saving mode among the plurality of printers has a relative priority while there is a printer among the plurality of printers which is not in power-saving mode. The printer determination unit 113 determines the printer which executes the print output according to the priority order. A printer with a higher priority order is prioritized for use in the print output of the print data. In other words, the printer determination unit 113 has the function of an output apparatus unit configured to determine a printing apparatus which outputs print data based on the determined priority order.

The printer determination unit 113 may determine a priority order of the printers based on information regarding the power consumption and method used by the fixing device contained in the printing information, the printer operation state, the printer operation rate, and the threshold for the operation rate contained in the printer selection information. The printer determination unit 113 may determine the priority order as shown below. The printer determination unit 113 determines a priority order using the operation rate of the printer based on information related to the operation rate contained in the apparatus information. The printer determination unit 113 compares a preset threshold with an operation rate of the printer to be prioritized to suppress power consumption based on information regarding the method of the fixing device provided in printer which is contained in the output print characteristics information.

The printer determination unit 113 determines the priority order according to the comparison result so that another printer has a relative priority in order to suppress the operation rate of the printer. The printer determination unit 113 is provided with a printer selection user interface (UI) unit 121. The printer selection UI unit 121 is a display unit configured to display the printer selection screen which is the screen which enables a user to execute selection operations of the printer. The determined priority order and the printers corresponding to the priority order are displayed on the printer selection screen. The user can select a printer to execute print output on the printer selection screen. When a printer other than the printer which has the highest priority order is selected by a user, the printer determination unit 113 may output warning information.

The output unit 114 executes printing processing using the printer determined by the printer determination unit 113. More specifically, the output unit 114 makes a print output execution request to the OS (not illustrated). The print output execution request is a request which causes the printer determined by the printer determination unit 113 to execute print output processing of the print data. The print data is print data received by the output unit 114 from the selection printer driver 105. The OS receiving the print output execution request sends the print data to the printer which will execute the print output via the graphics engine 102, the printer driver 103 and the system spooler 104. The printer which has received the print data executes the print output processing. In other words, the output unit 114 and the OS (not illustrated) have the function of a control unit or an output unit configured to output the print data to the printer determined as the printer which will execute the print output. The selection information setting unit 115 sets the printer selection information and stores the information in the printer selection information DB 107. The selection information setting unit 115 includes a printer selection setting UI unit 122. The printer selection setting UI unit 122 displays a screen configured to enable a user to perform setting operation of the printer selection information.

The printer information storage server 2 includes the host communication unit 201, a printer information management unit 202, a printer information acquisition unit 203 and the printer information DB 204. The printer information management unit 202 manages printer information stored in the printer information DB 204. For example, the printer information management unit 202 receives an acquisition request for printer information from the printer information acquisition unit 112 of the host computer 1 via the network 7 and the host communication unit 201. The printer information management unit 202 extracts printer information from the printer information DB 204 and transfers the extracted printer information to the printer information acquisition unit 112 of the host computer 1 via a host communication unit 201 and a network 7. The printer information acquisition unit 203 acquires printer information from the printer connected with the printer information storage server 2 via the network 7 and stores the information in the printer information DB 204. The printer information is stored in the printer information DB 204.

The printer 3 includes a printer information generation unit 301, a printer information response unit 302 and a printer information DB 303. The printer information generation unit 301 generates printer information and stores the generated printer information in the printer information DB 303. The printer information response unit 302 receives an acquisition request for printer information from the printer information acquisition unit 203 of the printer information acquisition server 2 and sends the printer information in the printer information DB 303 to the printer information acquisition unit 203. The print control according to the present exemplary embodiment is realized by the print output system illustrated in FIG. 4 or by the operation of a host computer including the print output system.

Figure 5A:
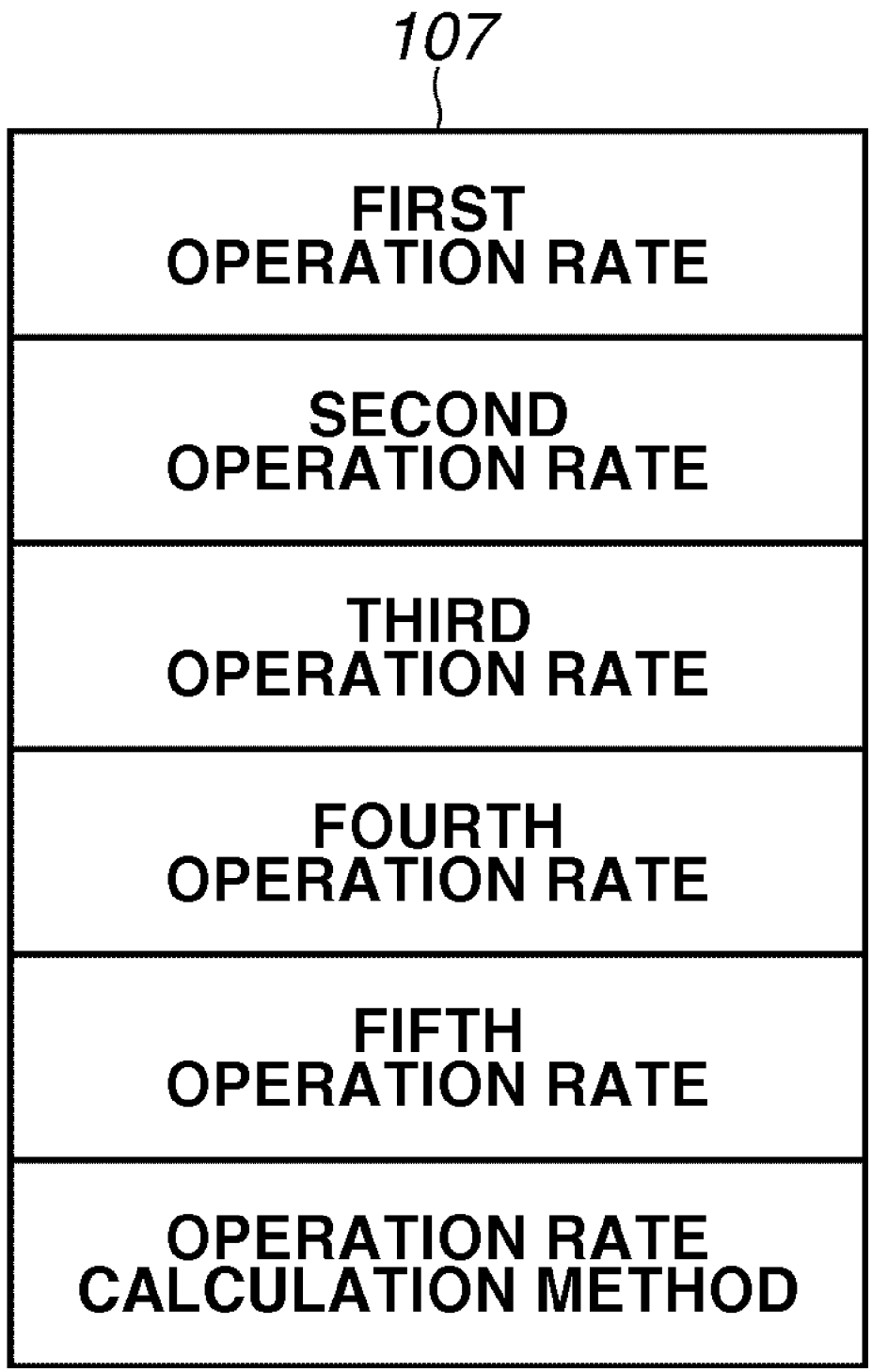

FIG. 5 illustrates an example of printer selection information and a screen for setting printer selection information. FIG. 5A illustrates an example of printer selection information. In this example, the printer selection information includes a first operation rate to a fifth operation rate and an operation rate calculation method. The operation rate calculation method is information indicating the method for calculating the printer operation rate. The first operation rate to a fifth operation rate indicate a threshold value for an operation rate for the printer according to the method used by the fixing device provided in the printer.

For example, in an environment of a plurality of on-demand printers, the first operation rate is an operation rate threshold value which is a reference for changing the on-demand printer that is to be used. The second operation rate is an operation rate threshold value for on-demand printers which is a reference to use a roller printer which is already in an operating state or in a standby (temperature regulated) state. The third operation rate is an operation rate threshold value for on-demand printers which is a reference to use a roller printer which is already in a sleep state (not temperature regulated) in an environment in which on-demand printers and roller printers are mixed. Their relationship is the first operation rate≦second operation rate<third operation rate. The fourth operation rate is an operation rate threshold value which is a reference to use a roller printer which is already in an operating state or in a standby state in an environment of a plurality of roller printers. The fifth operation rate is an operation rate threshold value for roller printers which is a reference to use a roller printer which is in asleep state in an environment of a plurality of roller printers. Their relationship is the fourth operation rate<fifth operation rate.

FIG. 5B illustrates an example of a screen for setting printer selection information. The screen for setting printer selection information is displayed by the printer selection setting UI unit 122 described above according to FIG. 4. A user can set printer selection information by setting operations on the screen illustrated in FIG. 5B. In the example illustrated in FIG. 5B, the selection information setting unit 115 sets the first to the fifth operation rates according to the operations set by a user. Furthermore the selection information setting unit 115 employs a calculation method for the operation rate in response to the operations set by the user in which an average value from startup to a current time, or an average value for an immediately previous number of hours is set. When an average value for an immediately previous number of hours is used, the user may instruct the period to be used for calculation of the operation rate (calculation period). In the example illustrated in FIG. 5B, after checking the item "working hours", the working hours used in calculation of the operation rate is set by clicking on a respective day. Alternatively, the user can set the time used as working hours (in the example in FIG. 5B, 9:00-12:00, 13:00-17:00).

Figure 6A:
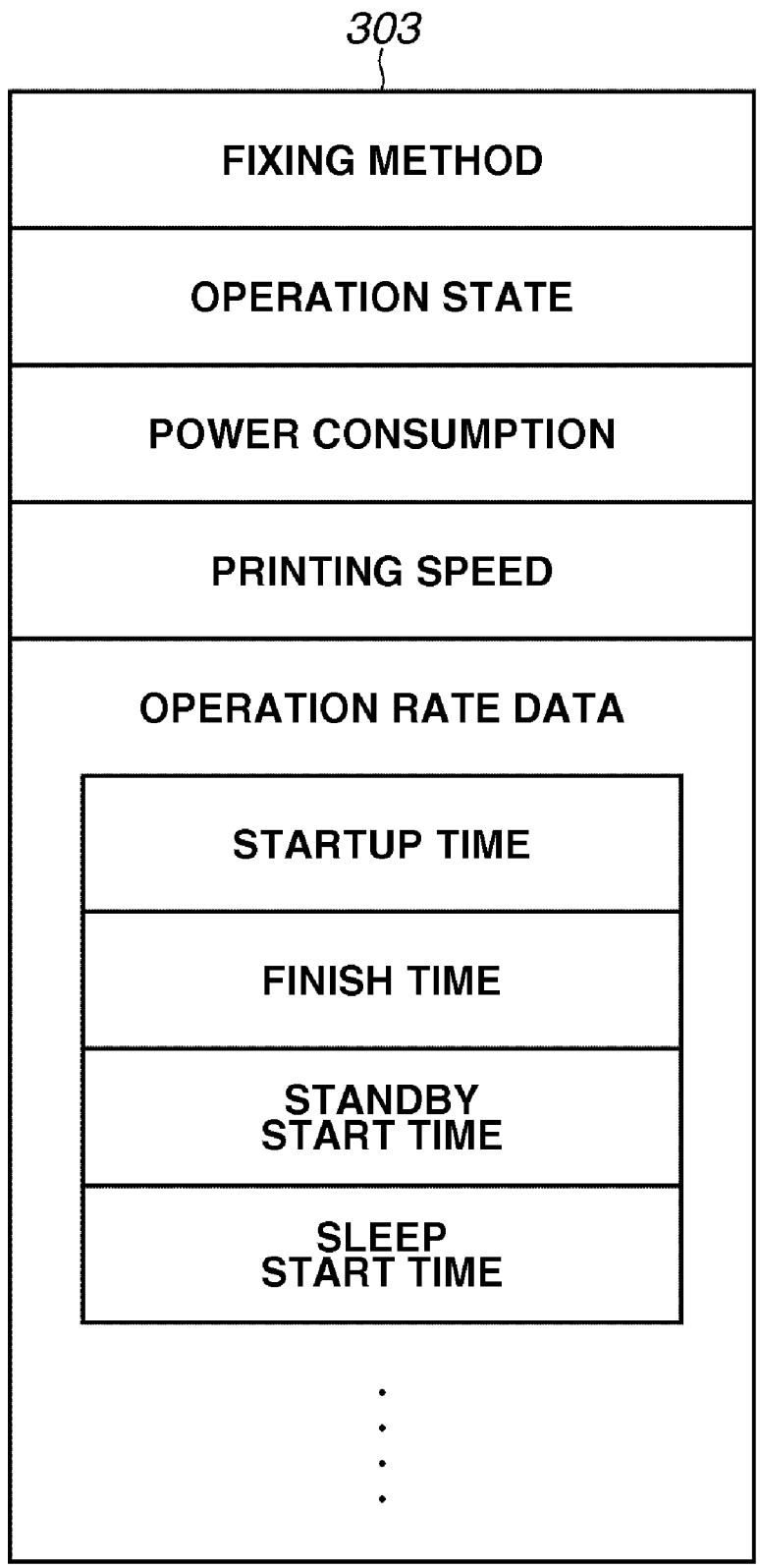
FIGS. 6A and 6B illustrate a printer information example and a data configuration example of a printer information DB.

FIG. 6 illustrates an example of printer information within a printer and a data configuration example of a printer DB in the printer information storage server. FIG. 6A illustrates an example of printer information within a printer. In this example, the printer information includes the fixing method, operation state, power consumption, printing speed and operation rate data. The fixing method indicates the method used by the fixing device in each printer. The operation state indicates a current operating state of a printer. Power consumption indicates an average value for power consumption during printer operation. Operation rate data is data related to printer operation. The operation rate data includes startup time, finish time, standby start time and sleep start time. The startup time indicates the time when printer operation commences. Finish time indicates the time at which printer operation ends. Standby start time indicates the time at which a printer started to shift to a standby mode. The sleep start time is the time at which a printer starts to shift from a standby state to a sleep state. The printer information has a data structure in which a standby start time and a sleep start time are alternately repeated from startup to finishing.

Figure 6B:
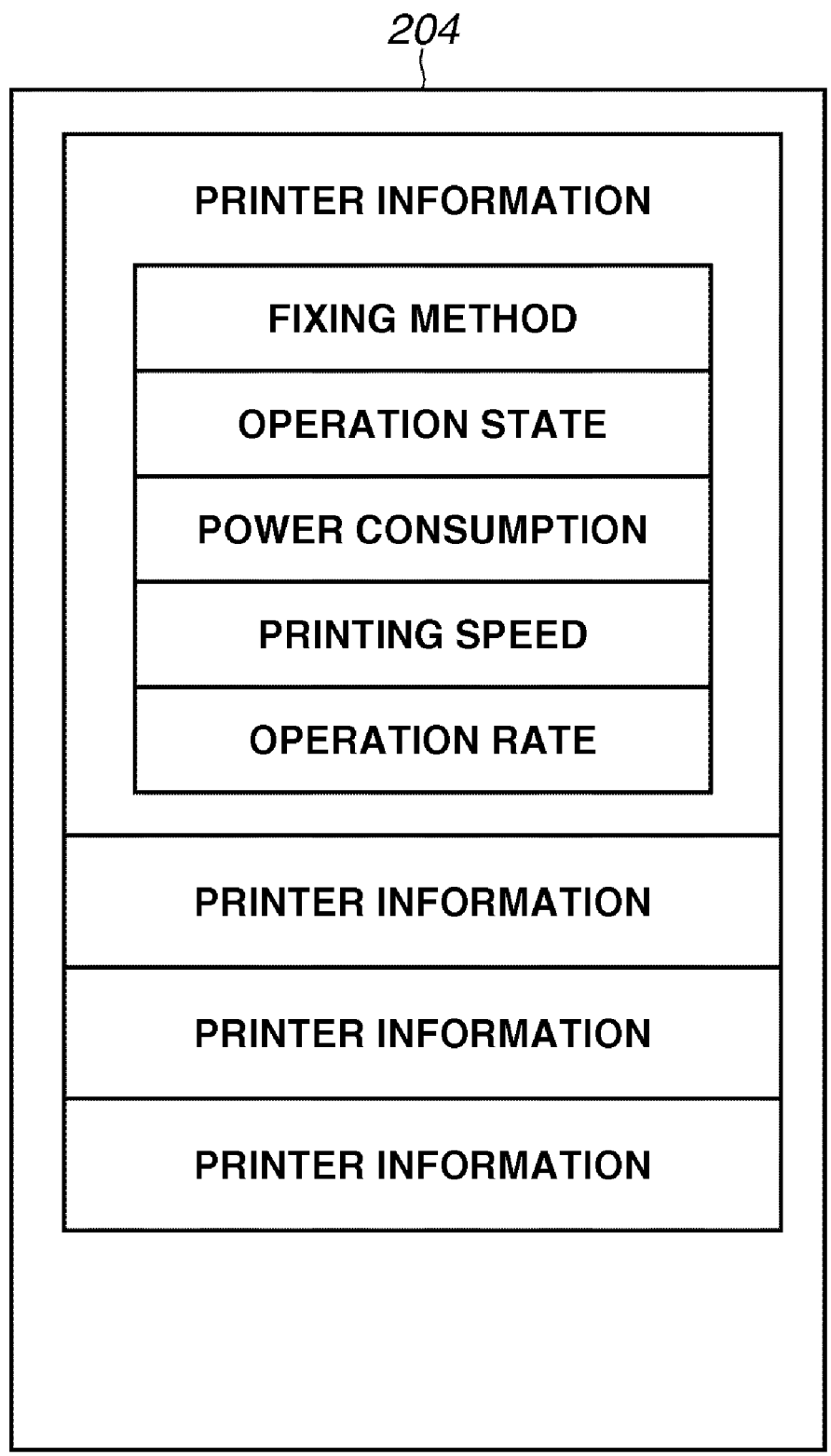

FIG. 6B illustrates a data configuration example of a printer information DB in a printer information storage server. The example illustrates the data configuration of the printer information in the printer information DB 204 illustrated in FIG. 4. Printer information in the printer information DB 204 is stored for each printer in a network 7. The printer information includes for example a printer fixing method, the printer operation state, the printer power consumption, the printer printing speed and the printer operation rate. The printer fixing method, the printer power consumption and the printer printing speed are print characteristics information of a printer. The operation rate is an operation rate calculated based on operation rate data in the printer information acquired by the printer information acquisition unit 203 from a printer. The printer information acquisition unit 203 of the printer information storage server 2 (refer to FIG. 4) acquires printer information as illustrated in FIG. 6A from each printer. The acquired printer information is stored in the printer information DB 204 in the data configuration as illustrated in FIG. 6B.

Figure 7:
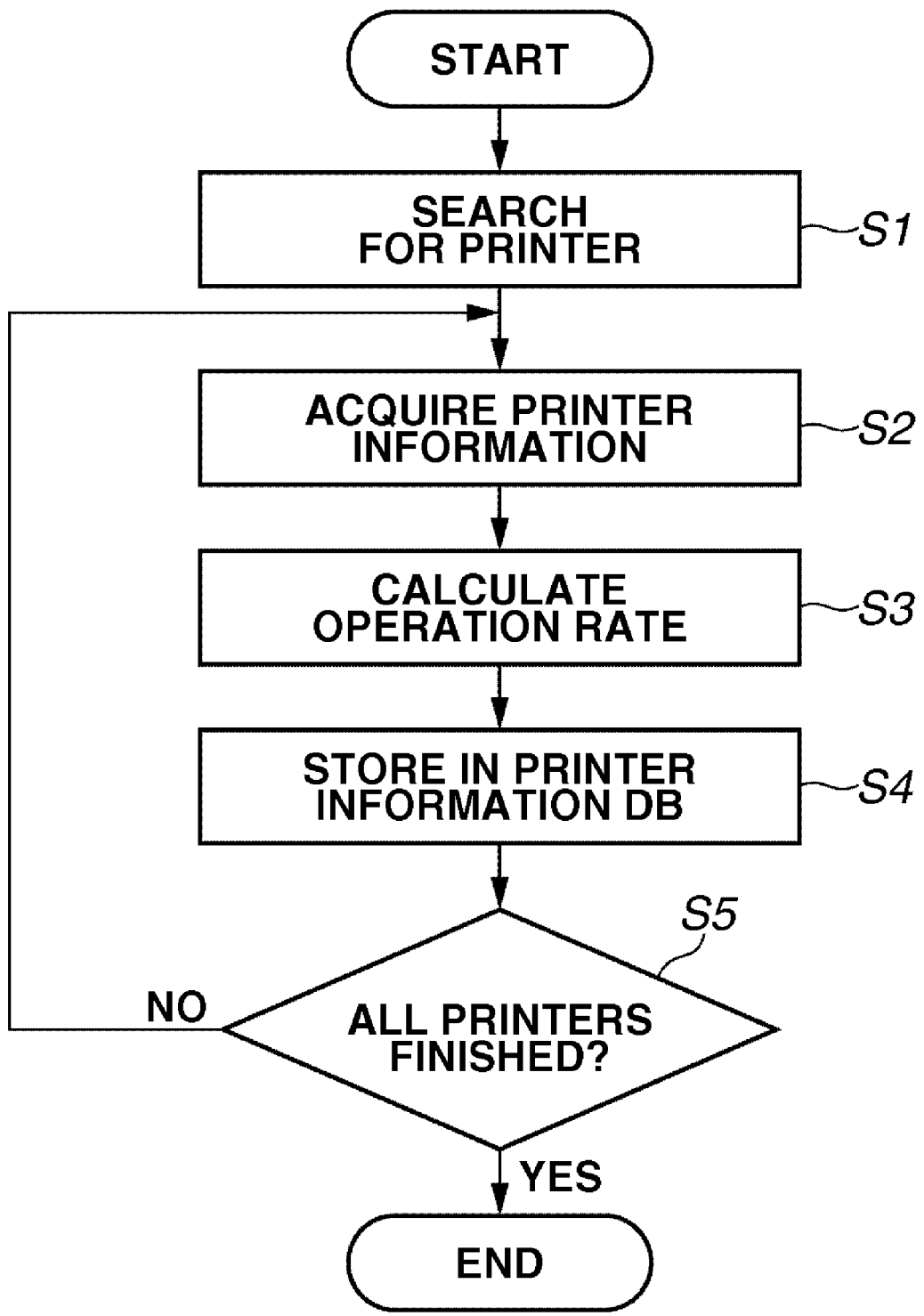
FIG. 7 illustrates an example of the flow of storage processing of printer information.

FIG. 7 illustrates an example of the flow of storage processing of printer information into the printer information storage server. The program related to this flow of processing is stored in a predetermined storage unit (for example a hard disk) provided in the printer information storage server 2 as illustrated in FIG. 4, is read into a RAM (main memory) (not illustrated) and executed by a CPU.

Firstly in step S1, the printer information acquisition unit 203 searches for a printer on the network. Then in step S2, the printer information acquisition unit 203 acquires printer information from the search printer. In step S2, the printer information acquisition unit 203 acquires printer selection information in the printer selection information DB 107 (refer to FIG. 4) from the host computer 1. More specifically, a predetermined printer selection information extraction unit (not illustrated) provided in the host computer 1 extracts printer information from the printer selection information DB 107 and transfers the information through the network 7 and the host communication unit 201 to the printer information acquisition unit 203. The printer information acquisition unit 203 acquires information indicating the calculation method of the operation rate contained in the acquired printer selection information.

Then in step S3, the printer information acquisition unit 203 calculates the printer operation rate based on the operation rate calculation method and the operation rate data in the acquired printer information. For example, an example of the calculation method of the operation rate when an average value from startup to the current time is set is as follows:

Operation rate=overall operating time/overall startup time=Σ(sleep start time−standby start time)/(current time−startup time).

Alternatively an example of the calculation method of the operation rate when an average value for an immediately previous number of hours is set is as follows:

Operation rate=overall operating time/startup time=Σ (sleep start time−standby start time)/calculation hours.

The calculation hours in the denominator of the above equation is the calculation hours instructed by a user on the setting screen for printer selection information described referring to FIG. 5B.

When working hours are set, the operation rate calculation method may calculate the operation rate by excluding hours other than working hours. In this manner, hours other than working hours (holidays or out-of-work hours) may be normally set to an operation rate of zero. Naturally, an operation rate which does not include particular treatment for holidays or out-of-work hours may be used in calculation of the operation rate.

Then in step S4, the printer information acquisition unit 203 stores printer information in a data form as described above referring to FIG. 6B. In step S5, it is determined whether the storage process of printer information for all printers searched in step S1 in the printer information DB 204 is completed. When it is determined that there is a printer for which the storage process of printer information has not been completed, the printer information acquisition unit 203 returns to step S2. The printer information acquisition unit 203 completes the process when it is determined that the storage process of printer information for all printers searched in step S1 has been completed.

Figure 8:
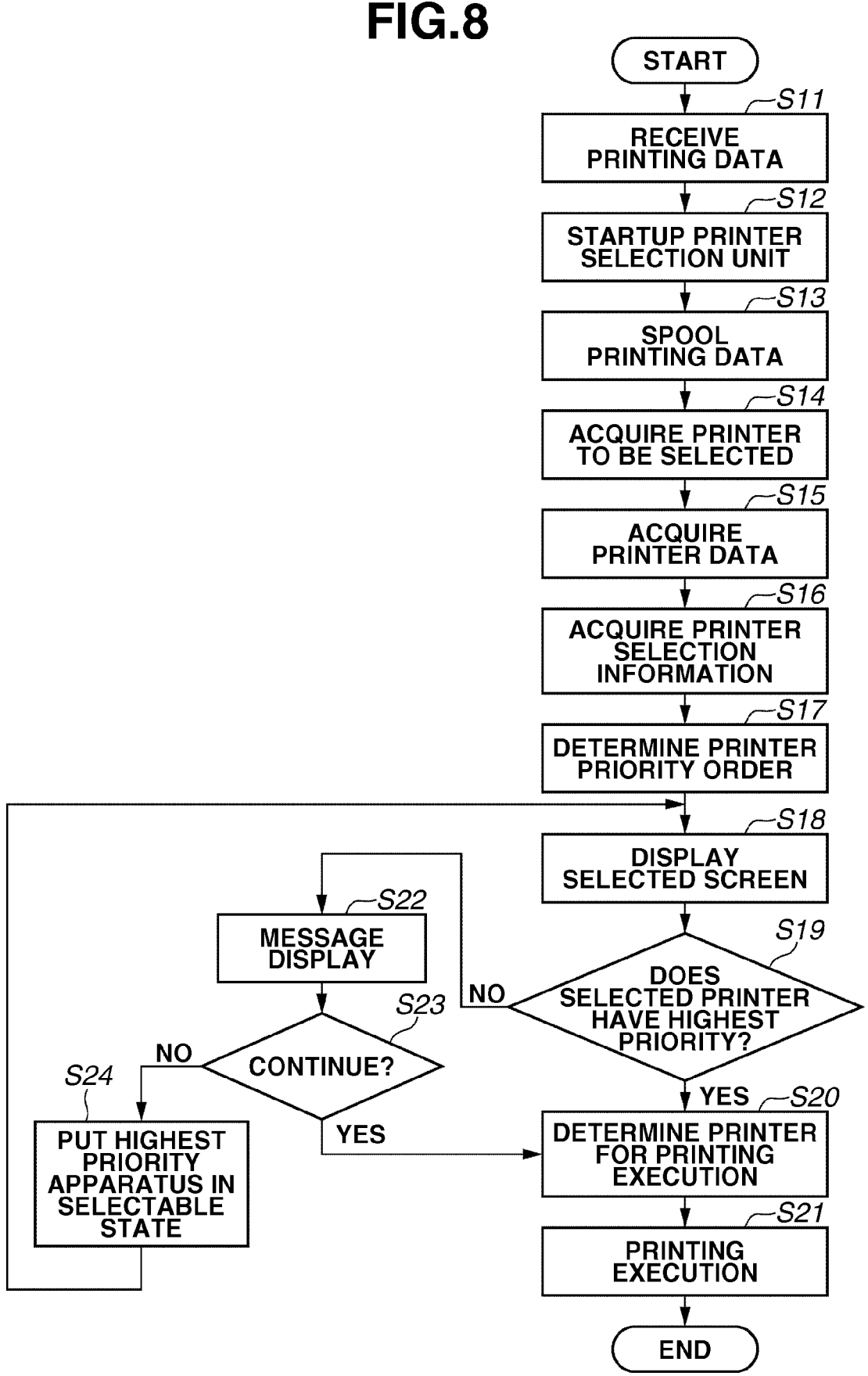
FIG. 8 illustrates an example of the flow for determining a printer which executes print output.

FIG. 8 illustrates an example of the flow of determination processing of a printer which executes print output according to a first exemplary embodiment of the present invention. When the application 101 of the host computer 1 commences a document printing process, the graphics engine 102 generates print data. Then in step S11, the selection printer driver 105 receives generated print data from the graphics engine 102. Then in step S12, the selection printer driver 105 starts up the printer selection unit 106. In the present exemplary embodiment, although the printer selection unit 106 is configured to be started up by the selection printer driver 105, startup may be performed by the resident OS. In step S13, the selection printer driver 105 provides (spools) print data to the printer selection unit 106. In step S14, the printer search unit 111 searches the printer driver installed in the current host computer 1. In this manner, a target printer as the printer for execution of the print output (printer to be selected) is acquired. In step S14, a printer corresponding to the selection printer driver 105 may be searched on the network 7 by making the selection printer driver 105 adaptable to a plurality of printers.

In step S15, the printer information acquisition unit 112 acquires printer information for selected printers from the printer information DB 204 via the host communication unit 202 of the printer information storage server 2 and the network 7. Then in step S16, the printer determination unit 113 acquires printer selection information from the printer selection information DB 107. In step S17, the printer determination unit 113 determines a priority order for the selected printers based on the printer information acquired in step S15 and the printer selection information acquired in step S16.

Figure 9A:
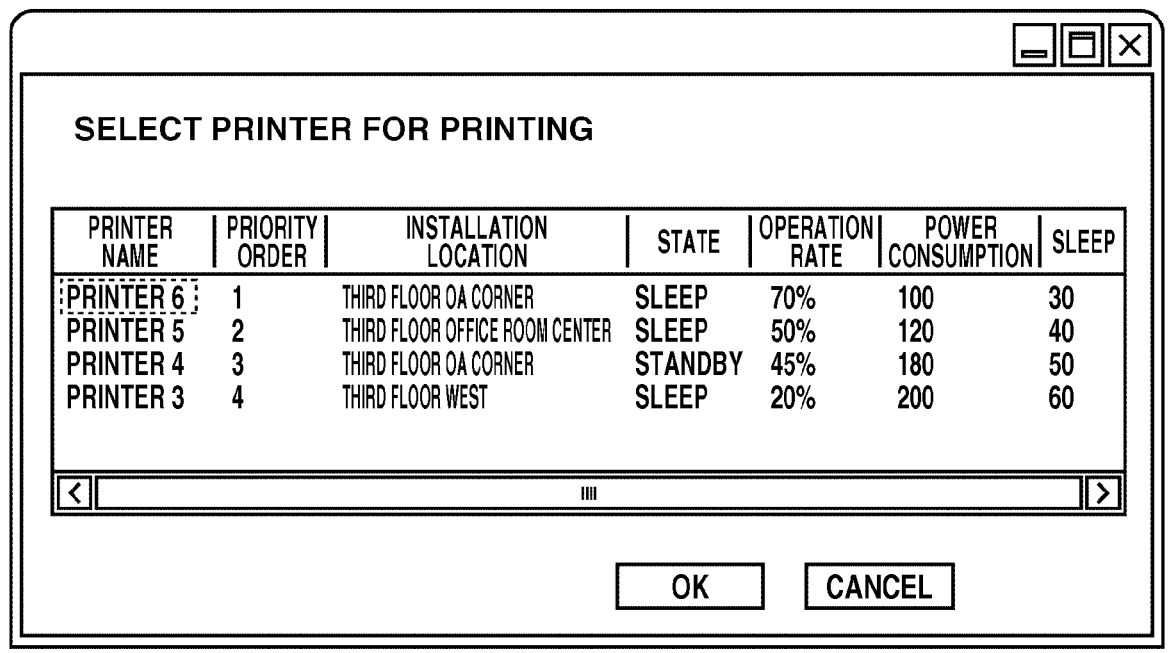
FIGS. 9A and 9B illustrate an example of a printer selection screen and an example of a message box.

Then in step S18, the printer selection UI unit 121 displays a printer selection screen as illustrated in FIG. 9A. The printer selection UI unit 121 displays the printer name for the printer, operational states including the printing speed, the level of power consumption, the operation rate, location information such as the installation position of the printer and the priority order determined in step S17. These operational states are information indicating a power saving mode for a printer. When a user selects a printer and presses the "OK" button in FIG. 9A, the process proceeds to step S19. When a user presses a "Cancel" button in FIG. 9A, the printing process is terminated.

Figure 9B:
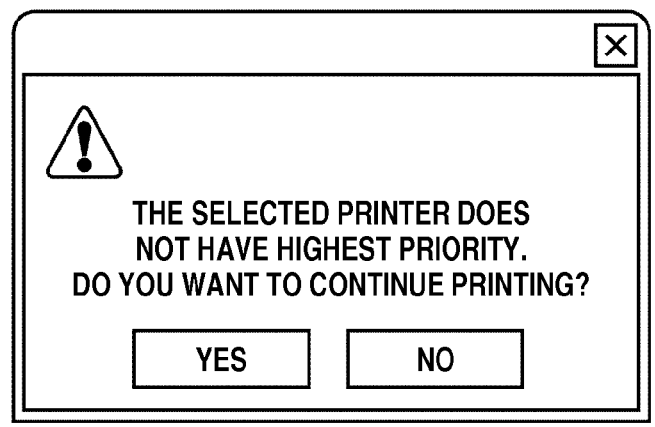

In step S19, the printer determination unit 113 determines whether the printer selected via the printer selection screen has the highest priority order (whether it has a priority order of 1). When the printer determination unit 113 determines that the priority order of the printer selected by the user is 1, the process proceeds to step S20 and determines the printer as the printer for execution of the print output (printing execution printer). When the printer determination unit 113 determines that the priority order of the printer selected by the user is not 1, the process proceeds to step S22. In step S22, the printer determination unit 113 displays a screen (message screen) inquiring whether the user wishes to continue printing with the selected printer as illustrated in FIG. 9B. The message displayed in the message box is warning information indicating that a printing apparatus other than the printing apparatus with the highest priority order has been selected by a user.

When it is determined in step S23 that a user instructs continuation of printing with the selected printer, the process proceeds to step S20 and the printer is determined as the printing execution printer. When it is determined in step S23 that a user instructs that continuation of printing using the selected printer should be cancelled, in step S24, the printer selection UI unit 121 places the printer having a priority order of 1 in a selection state and returns to step S18. In step S21, the output unit 114 starts the printing processing using the printing execution printer. More specifically, the output unit 114 makes a print output request to the OS. The OS which receives the print output request sends the print data to the printing execution printer via the graphics engine 102, the printer driver 103 and the system spooler 104. The printing execution printer receives the transferred print data, executes printing and finishes the process.

Figure 10B:
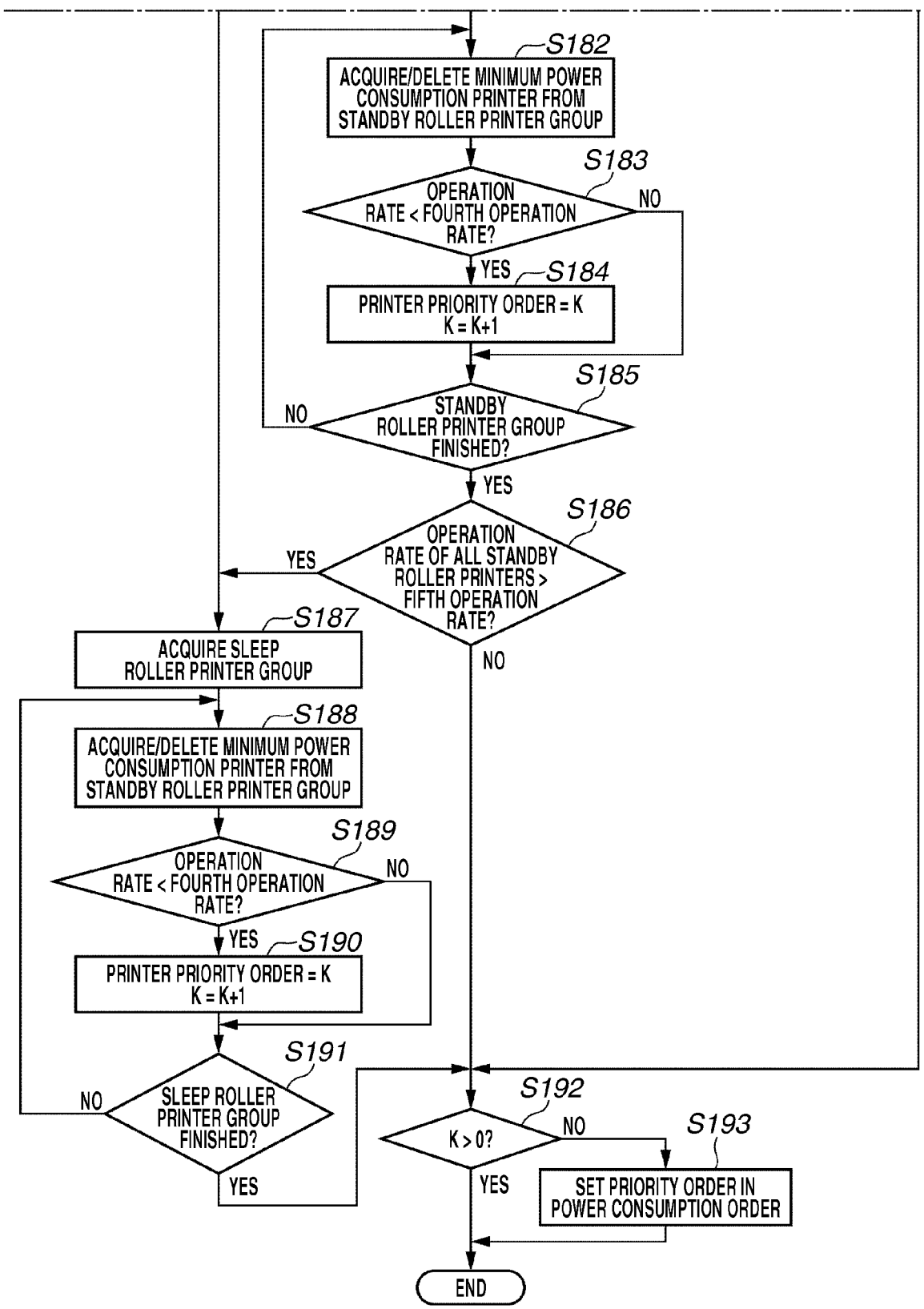
FIG. 10 (including FIG. 10A and FIG. 10B) describes the details of a process for determining a priority order of printers.

FIG. 10 (including FIG. 10A and FIG. 10B) describes the details of a determination process for priority order of printers in step S17 illustrated in FIG. 8. In FIG. 10, the letter K denotes a variable showing the priority order in which the lower the number, the higher priority order.

Firstly in step S171, the printer determination unit 113 substitutes a value of zero for the variable K indicating the priority order and places the priority order of all selected printers acquired in step S14 in FIG. 8 to a value of N (printer number). Then in step S172, the printer determination unit 113 refers to the fixing method in the printer information acquired in step S15 in FIG. 8 and acquires an on-demand printer group from the selected printers. Then in step S173, the printer determination unit 113 acquires the printer having the lowest power consumption from among the on-demand printer group based on the printer information and deletes the acquired printer as processed from the on-demand printer group. In step S174, the printer determination unit 113 refers to the printer selection information and determines whether the operation rate of the acquired printer is smaller than a first operation rate. When it is determined that the operation rate of the acquired printer is smaller than a first operation rate, the process proceeds to step S175. When the printer determination unit 113 determines that the operation rate of the acquired printer is not smaller than a first operation rate, the process proceeds to step S176.

In step S175, the printer determination unit 113 places the priority order of the printer in question to a value of K and substitutes a value equal to K incremented by a value of 1. Then the process proceeds to step S176. In step S176, the printer determination unit 113 determines whether processing of all on-demand printers is completed. When the printer determination unit 113 determines that processing of all on-demand printers is completed, the process proceeds to step S177. When the printer determination unit 113 determines that there is an on-demand printer for which processing has not been completed, the process returns to step S173. Then in step S177, the printer determination unit 113 determines whether the operation rate of all on-demand printers is greater than the third operation rate. When the printer determination unit 113 determines that the operation rate of all on-demand printers is greater than the third operation rate, the process proceeds to step S180. When the printer determination unit 113 determines that there is an on-demand printer with an operation rate which is not greater than the third operation rate, the process proceeds to step S178. In step S178, the printer determination unit 113 determines whether the operation rate of all on-demand printers is greater than the second operation rate. When the printer determination unit 113 determines that the operation rate of all on-demand printers is greater than the second operation rate, the process proceeds to step S179. When the printer determination unit 113 determines that there is an on-demand printer with an operation rate which is not greater than the second operation rate, the process proceeds to step S192. In step S179, the printer determination unit 113 refers to the printer information and determines whether there is a roller printer group currently in a standby state. When the printer determination unit 113 determines that there is a roller printer group currently in a standby state, the process proceeds to step S181. When the printer determination unit 113 determines that there is not a roller printer group currently in a standby state, the process proceeds to step S192.

On the other hand, in step S180, the printer determination unit 113 refers to the printer information and determines whether there is a roller printer group currently in a standby state. When the printer determination unit 113 determines that there is a roller printer group currently in a standby state, the process proceeds to step S181. When the printer determination unit 113 determines that there is not a roller printer group currently in a standby state, the process proceeds to step S187. In step S181, the printer determination unit 113 acquires a roller printer group which is in a standby state. Then in step S182, the printer determination unit 113 acquires the printer with the lowest power consumption from the on-demand printer group which is in a standby state and then deletes the printer as processed from the roller printer group which is on standby. Next, in step S183, the printer determination unit 113 determines whether the operation rate of the acquired printer is smaller than a fourth operation rate. When the printer determination unit 113 determines that the operation rate of the acquired printer is smaller than a fourth operation rate, the process proceeds to step S184. When the printer determination unit 113 determines that the operation rate of the acquired printer is not smaller than a fourth operation rate, the process proceeds to step S185.

In step S184, the printer determination unit 113 places the priority order of the subject printer to a value of K and substitutes a value equal to K incremented by a value of 1. Then in step S185, the printer determination unit 113 determines whether processing of all roller printers in a standby state is completed. When the printer determination unit 113 determines that there is an unprocessed roller printer among the roller printers in a standby state, the process returns to step S182. When the printer determination unit 113 determines that processing of all roller printers in a standby state is completed, the process proceeds to step S186. In step S186, the printer determination unit 113 determines whether the operation rate of all roller printers in a standby state is greater than the fifth operation rate. When the printer determination unit 113 determines that the operation rate of all roller printers in a standby state is greater than the fifth operation rate, the process proceeds to step S187. When the printer determination unit 113 determines that there is a roller printer with an operation rate which is not greater than the fifth operation rate of the roller printers in a standby state, the process proceeds to step S192.

In step S187, the printer determination unit 113 acquires the roller printer group which is in a sleep state. Then in step S188, the printer determination unit 113 acquires the printer with the lowest power consumption from the roller printer group which is in a sleep state and then deletes the printer as processed from the roller printer group which is in a sleep state. Next, in step S189, the printer determination unit 113 determines whether the operation rate of the acquired printer is smaller than a fourth operation rate. When the printer determination unit 113 determines that the operation rate of the acquired printer is smaller than a fourth operation rate, the process proceeds to step S190. When the printer determination unit 113 determines that the operation rate of the acquired printer is not smaller than a fourth operation rate, the process proceeds to step S191.

In step S190, the printer determination unit 113 places the priority order of the subject printer to a value of K and substitutes a value equal to K incremented by a value of 1. Then in step S191, the printer determination unit 113 determines whether processing of all roller printers in a sleep state is completed. When the printer determination unit 113 determines that processing of all roller printers in a sleep state has been completed, the process proceeds to step S192. When the printer determination unit 113 determines that there is a roller printer which has not been processed of the roller printers in a sleep state, the process returns to step S188. In step S192, the printer determination unit 113 determines that the variable K is greater than zero. When the printer determination unit 113 determines that the variable K is not greater than zero, that is to say, that the variable K has a value of zero, it indicates that there is no priority order set for any printer. Thus the process proceeds to step S193. In step S193, the printer determination unit 113 sets a priority order so that printers having smaller power consumption are denoted by larger priority order values. When the printer determination unit 113 determines that the variable K is larger than zero, the processing is terminated.

In step S182 in FIG. 10, the printer determination unit 113 may refer to the printer information and acquire the printer having the highest printing speed from the group of roller printers in a standby state. In step S188, the printer determination unit 113 may refer to the printer information and acquire the printer with the highest printer speed from the group of roller printers in a sleep state. Furthermore in step S193, the printer determination unit 113 may apply a higher priority order to printers of lower operation rate instead of printers having lower power consumption. The printer determination unit 113 may apply the priority order only to printer in a standby state.

On-demand printers provided in a print output system may use the processes in step S172 to S176 in FIG. 10 to create a priority order which increases as the power consumption of the printers decreases. Thus even on-demand printers in a sleep state can be used as a printing execution printer if the priority order increases as the power consumption decreases. This arrangement means that even when there is an on-demand printer in a standby state in the system, a priority order may be determined so that an on-demand printer in a sleep state is used (for example, refer to FIG. 9A). When a printing request is not frequently generated, this processing operation enables print output operations to alternate between on-demand printers in a sleep state and a standby state and facilitates transition of roller printers to a sleep state. As a result, a reduction of power consumption in the overall system is realized. Furthermore when the process from step S177 to S190 in FIG. 10 places the operation rate of all on-demand printers in an extremely high state (for example, a higher state than the second operating rate or the third operating rate), the roller printers are set to a high priority order. Generally a roller printer has a higher printing speed than an on-demand printer. Thus the print output processing of the overall system can be improved and the processing efficiency can be improved by setting the high priority order to the roller printers.

Figure 11:
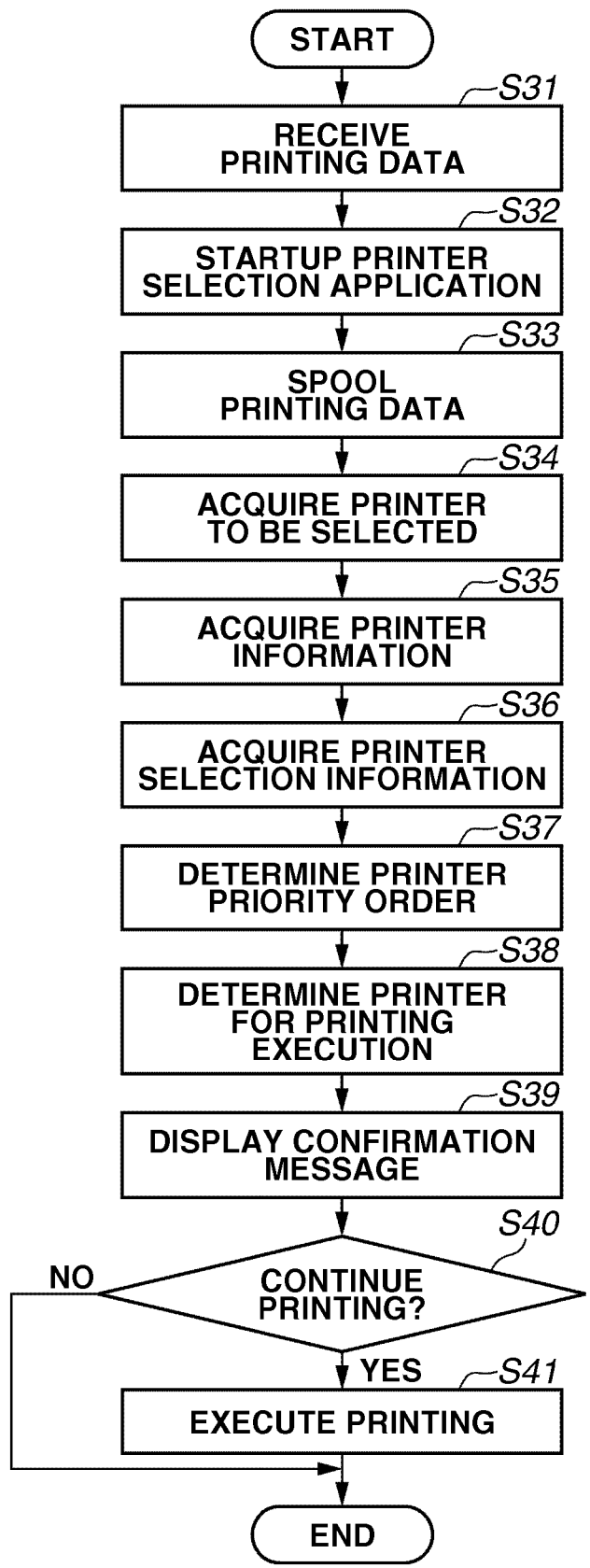
FIG. 11 illustrates an example of the flow for determining a printer, which executes print output.

FIG. 11 illustrates an example of the flow of determination process of a printer which executes print output according to a second exemplary embodiment of the present invention. In the flow of the determination process of the printer according to the first exemplary embodiment as described according to FIG. 8, the printer selection UI unit 121 displays a printer selection screen configured to enable selection of a printing execution printer by a user. In the second exemplary embodiment, the printer determination unit 113 determines the printing execution printer without a selection operation executed by a user.

Figure 12:
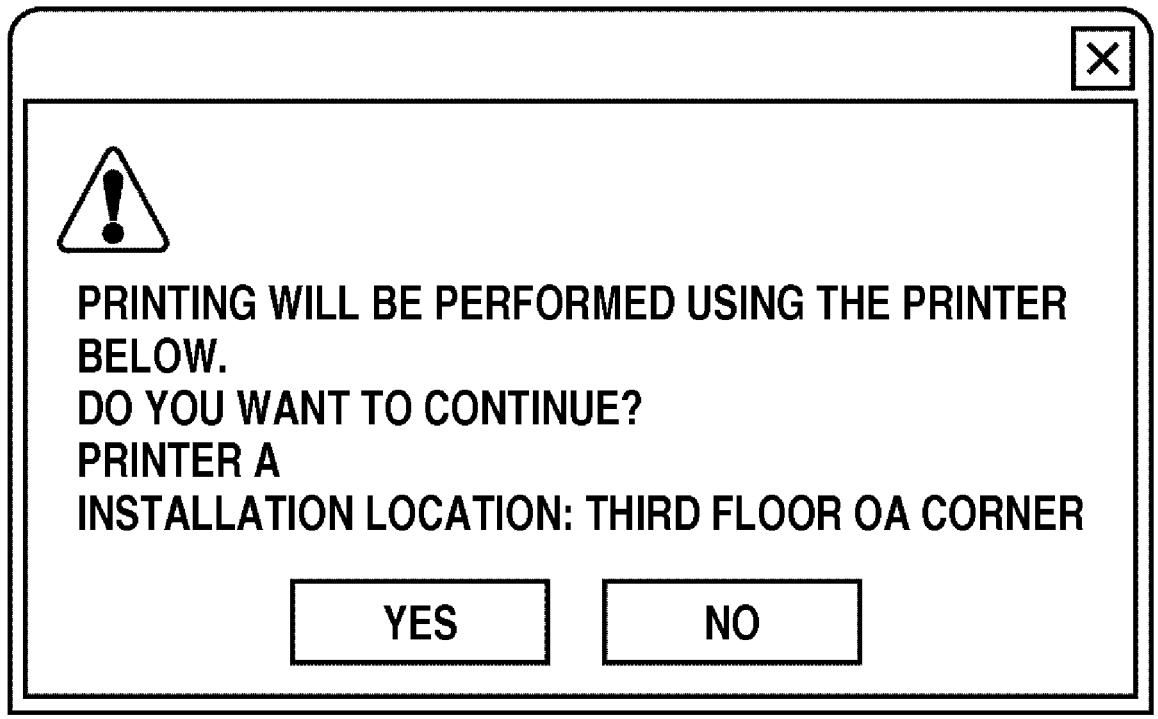
FIG. 12 illustrates an example of a screen display for a confirmation message.
Figures 13A, 13B:
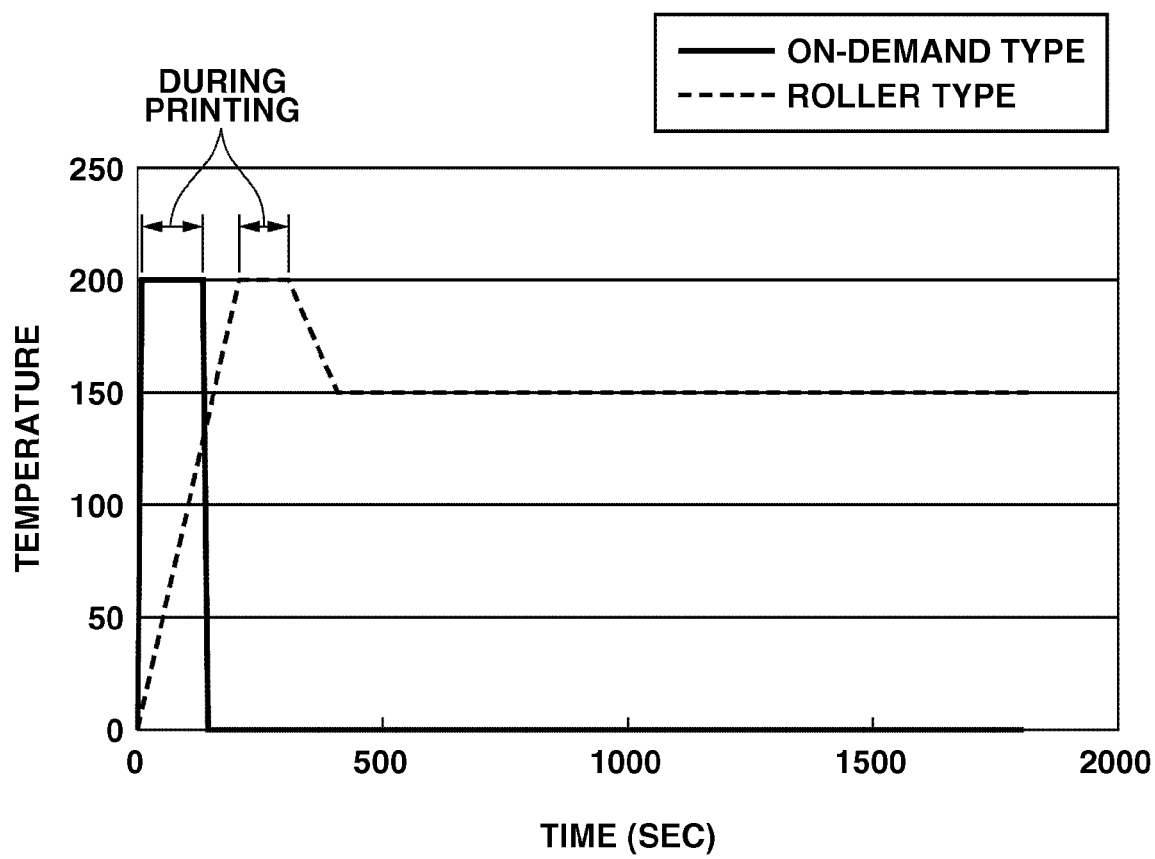
FIGS. 13A and 13B illustrate characteristics of a fixing device, and the relationship between temperature and printing for each fixing method.

The process in step S31 to step S37 in FIG. 11 is the same as the process in step S11 to step S17 in FIG. 8. In step S38 in FIG. 11, the printer determination unit 113 determines as the printer to execute printing, the printer having the highest priority order determined by the process in step S37. Then in step S39, the printer determination unit 113 displays a confirmation message. The confirmation message enables the user to confirm that printing will be continued using the determined printing execution printer and the installation position of the printing execution printer. More specifically, the printer determination unit 113 as illustrated in FIG. 12 displays confirmation message that printing will be continued using printer A and the installation position of printer A.

In step S40 in FIG. 11, the printer determination unit 113 determines whether to continue printing using the printing execution printer. For example, on the screen illustrated in FIG. 12, when the user presses the button "Yes", the printer determination unit 113 determines to continue printing using the printing execution printer (printer A) and the process proceeds to step S41 in FIG. 11. In the screen illustrated in FIG. 12, when the user presses the button "No", the printer determination unit 113 determines not to continue printing using the printing execution printer and the process is terminated. Then in step S41, the printing execution printer executes print output.

In the present exemplary embodiment, a process configured to determine a printing execution printer according to a fixing method of a printer was described taking a fixing method of a fixing device as one characteristic of a printer. However the present invention may use any printer characteristic if it is a characteristic which can be used as a reference to determine a priority order of printer for use in print output. For example, the time until returning from a sleep state or the time until shifting from a standby state to a sleep state may be defined as a characteristic of the printer and the print output system of the present invention may be adapted so that the printing execution printer is determined according to such characteristics. In this manner, a printer having a short return time may be prioritized and used, or a printer having a short sleep transition time may be prioritized and used.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-146206 filed Jun. 19, 2009, which is hereby incorporated by reference herein in its entirety.

What is claimed is:

1. A control apparatus configured to control output processing of a plurality of printing apparatuses having different characteristics, the control apparatus comprising:
    an information acquisition unit configured to acquire information including characteristics information indicating characteristics of a printing apparatus;
    a priority order determination unit configured to determine a priority order based on the characteristics information so that a printing apparatus in a power saving mode among the plurality of printing apparatuses has a relative priority; and
    a control unit configured to cause the printing apparatus to execute output of print data based on the determined priority order, wherein
    the characteristics information includes information regarding a method employed by a fixing device provided in the printing apparatus,
    the priority order determination unit further determines a priority order using an operation rate of the printing apparatus based on information related to the operation rate contained in the acquired apparatus information, and
    a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

2. The control apparatus according to claim 1, wherein a display unit is provided to display a screen for selecting a printing apparatus to output print data from the plurality of printing apparatuses based on a priority order.

3. The control apparatus according to claim 2, wherein the display unit displays location information and an apparatus state indicating whether the plurality of apparatuses is in a power saving mode, on the screen.

4. A control apparatus configured to control output processing of a plurality of printing apparatuses having different characteristics comprising:
    a data acquisition unit configured to acquire print data;
    an information acquisition unit configured to acquire information including characteristics information which indicates characteristics of a printing apparatus;
    a priority order determination unit configured to determine a priority order of the plurality of printing apparatuses which output print data, based on the characteristics information;

an output determination unit configured to determine a printing apparatus which outputs print data based on the determined priority; and a control unit configured to cause the determined printing apparatus to output print data, wherein the characteristics information includes information concerning the method employed by a fixing device provided in the printing apparatuses, and when there is more than one method employed by the fixing devices, power consumption of the printing apparatus becomes different when states of a printing apparatus including a power saving mode vary, the priority order determination unit further determines a priority order using an operation rate of the printing apparatus based on information related to the operation rate contained in the acquired apparatus information, and a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

5. The control apparatus according to claim 4, wherein a display unit is provided to enable selection of a printing apparatus which outputs the print data from among the plurality of printing apparatuses according to the determined priority order, and the output determination unit determines a printing apparatus selected via a displayed screen as the printing apparatus which outputs print data.

6. The control apparatus according to claim 5, wherein the display unit displays location information and a state indicating whether the plurality of apparatuses is in a power saving mode.

7. The control apparatus according to claim 5, wherein the display unit further displays a screen including warning information when a printing apparatus other than the printing apparatus with a highest priority order is selected.

8. A method for a system including a plurality of printing apparatuses having different characteristics and a control apparatus configured to control output processing of print data by a printing apparatus, the method comprising:

acquiring information including characteristics information indicating characteristics of the printing apparatus;

determining a priority order of the plurality of printing apparatuses which output print data, based on the characteristics information; and causing a printing apparatus to output the print data; wherein the printing apparatus determined based on the priority order receives the print data and executes print output based on the print data, wherein the characteristics information includes information regarding a method employed by a fixing device provided in the printing apparatus, the determining further determines a priority order using an operation rate of the printing apparatus based on information related to the operation rate contained in the acquired apparatus information, and a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

9. A method configured to control output processing of a plurality of printing apparatuses having different characteristics, the method comprising:

acquiring information including characteristics information indicating characteristics of a printing apparatus;

determining a priority order based on the characteristics information so that a printing apparatus in power saving mode among the plurality of printing apparatuses has a relative priority among the plurality of printing apparatuses; and controlling to cause the printing apparatus to execute output of print data based on the determined priority order, wherein the characteristics information includes information regarding a method employed by a fixing device provided in the printing apparatus, the determining further determines a priority order using an operation rate of the printing apparatus based on information related to the operation rate contained in the acquired apparatus information, and a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

10. A method configured to control output processing of a plurality of printing apparatuses having different characteristics, the method comprising:

acquiring printing data;

acquiring information including characteristics information which indicates characteristics of a printing apparatus;

determining a priority order of a plurality of printing apparatuses which output the print data, based on the characteristics information;

determining a printing apparatus configured to output the print data based on the determined priority order; and controlling the determined printing apparatus to execute printing output of print data, wherein the characteristics information includes information concerning the method employed by a fixing device provided in the printing apparatuses, and when there is more than one method employed by the fixing devices, power consumption of the printing apparatus becomes different when states of a printing apparatus including a power saving mode vary, the priority order determination unit further determines a priority order using an operation rate of the printing apparatus based on information related to the operation rate contained in the acquired apparatus information, and a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

11. A computer readable storage medium on which is stored a computer program for making a computer execute a method for controlling a printing process of a plurality of printing apparatus each of which has output different characteristics, the method comprising:
acquiring information including characteristics information indicating characteristics of a printing apparatus;
determining a priority order based on the characteristics information so that a printing apparatus in a power saving mode among the plurality of printing apparatuses has a relative priority among the plurality of printing apparatuses; and
controlling to cause the printing apparatus to execute printing output of print data based on the determined priority order, wherein
the characteristics information includes information regarding a method employed by a fixing device provided in the printing apparatus,
the determining further determines a priority order using an operation rate of the printing apparatus based on information related to the operation rate contained in the acquired apparatus information, and
a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

12. A computer readable storage medium on which is stored a computer program for making a computer execute a method for controlling a printing process of a plurality of printing apparatuses each of which has output different characteristics, the method comprising:
acquiring printing data;
acquiring information including characteristics information which indicates characteristics of a printing apparatus;
determining a priority order of the plurality of printing apparatuses in the output of the print data based on the characteristics information;
determining a printing apparatus configured to output the print data based on the determined priority order; and
controlling to cause the determined printing apparatus to execute printing output of print data, wherein
the characteristics information includes information concerning the method employed by a fixing device provided in the printing apparatuses, and when there is more than one method employed by the fixing devices, power consumption of the printing apparatus becomes different when states of a printing apparatus including a power saving mode vary,
the priority order determination unit further determines a priority order using an operation rate of the printing apparatus based on information related to the operation rate contained in the acquired apparatus information, and
a priority order is determined so that another printing apparatus has a relative priority in order to suppress an operation rate of the printing apparatus according to a result of a comparison of a pre-set threshold and an operation rate of the printing apparatus which is to be prioritized to suppress power consumption based on information concerning the method employed by the fixing device provided in the printing apparatus, contained in the characteristics information.

* * * * *